United States Patent
Kishimoto

(10) Patent No.: US 8,466,643 B2
(45) Date of Patent: Jun. 18, 2013

(54) MOTOR DRIVE DEVICE, AND MOTOR DRIVE METHOD

(75) Inventor: Kenichi Kishimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/702,514

(22) PCT Filed: Jun. 8, 2011

(86) PCT No.: PCT/JP2011/003219
§ 371 (c)(1),
(2), (4) Date: Dec. 6, 2012

(87) PCT Pub. No.: WO2011/155189
PCT Pub. Date: Dec. 15, 2011

(65) Prior Publication Data
US 2013/0076284 A1    Mar. 28, 2013

(30) Foreign Application Priority Data
Jun. 11, 2010    (JP) ................... 2010-133624

(51) Int. Cl.
*H02P 6/20*    (2006.01)
(52) U.S. Cl.
USPC ............. 318/400.03; 318/400.05; 318/400.22
(58) Field of Classification Search
USPC .................. 318/700, 400.01, 400.03, 400.05, 318/400.06, 400.07, 400.22
See application file for complete search history.

(56) References Cited

U.S. PATENT DOCUMENTS

| | | | | |
|---|---|---|---|---|
| 4,835,448 A | * | 5/1989 | Dishner et al. | 318/400.11 |
| 5,491,391 A | * | 2/1996 | Bahr et al. | 318/39 |
| 5,814,957 A | * | 9/1998 | Yoshida | 318/400.11 |
| 6,538,406 B1 | * | 3/2003 | Kea | 318/434 |

FOREIGN PATENT DOCUMENTS

| | | |
|---|---|---|
| JP | 56-041702 A | 4/1981 |
| JP | 2000-116178 A | 4/2000 |
| JP | 2005-198442 A | 7/2005 |
| JP | 2009-113271 A | 5/2009 |

OTHER PUBLICATIONS

International Search Report for International Application No. PCT/JP2011/003219, dated Sep. 27, 2011, 2 pages.

* cited by examiner

*Primary Examiner* — Bentsu Ro
(74) *Attorney, Agent, or Firm* — Brinks Hofer Gilson & Lione

(57) ABSTRACT

A motor drive device includes a drive controller for generating drive signal "trq", a limiter for limiting a value of drive signal "trq" within a range, a limit value generator for generating limit value "lmt", and a drive output section for generating an energizing signal in response to an output signal from the limiter. The limit value generator generates a comparison signal by adding offset value "ofs" to drive signal "trq" and updates limit value "lmt" based on a size relation between a value (trq+ofs) of the comparison signal and limit value "lmt".

14 Claims, 20 Drawing Sheets

MOTOR DRIVE DEVICE, AND MOTOR DRIVE METHOD

This application is a 371 application of PCT/JP2011/003219 having an international filing date of Jun. 8, 2011, which claims priority to JP2010-133624 filed Jun. 11, 2010, the entire contents of which are incorporated herein by reference.

TECHNICAL FIELD

The present invention relates to a motor drive device and a motor drive method both employing a PWM driving method, more particularly, it relates to the motor drive device and the motor drive method both having a limiter function that limits a supply of a drive output to the motor.

BACKGROUND ART

A conventional motor drive device, of which limiter function increases a limit value of the limiter step by step at given time intervals from the start of driving, has been proposed in, e.g. Patent Literature 1. This motor drive device changes a duty ratio of a drive pulse used in PWM (Pulse Width Modulation) driving method, and drives the motor with a driving electric power in response to this duty ratio. The duty ratio starts from a predetermined one which gives the minimum power to drive a rotor when the motor starts driving, and then the duty ratio increases step by step at given time intervals with the motor kept driving. The foregoing mechanism allows the conventional drive device to drive the motor in a soft starting manner, and to reduce useless electric current at the start.

The foregoing conventional motor drive device intends to reduce the electric current needed at the start of the motor; however, a large amount of current, e.g. rush current, flows when a command value is changed, for instance, a speed of the motor is changed. The reduction in the electric current at the start of the motor is thus not enough for reducing the electric current in total. FIG. 20 shows changes in electric current when the speed of the conventional motor is changed. In FIG. 20, the waveforms on the upper part of the chart indicate a speed command that gives instruction of speed, and an actual speed of the motor in response to the instruction. The waveform on the middle part of the chart indicates a change in duty ratio of a PWM signal. The waveform on the lower part of the chart indicates a change in a motor current when the speed is changed as shown in the waveform on the upper part of the chart. As FIG. 20 shows, when the motor speed is changed to a higher one, a large amount of current such as a rush current flows.

As shown in FIG. 20, setting a current threshold amount (Ith) allows preventing the foregoing rush current; however, a current limitation works instantaneously in this case, so that the motor generates noises or encounters a great shock to its mechanical section when the electric current is limited.

In a case when the motor speed is lowered, a regeneration phenomenon of the motor inversely supplies a regeneration power to the motor drive device, so that a power supply voltage rises, thereby sometimes malfunctioning the devices connected to the power supply line.

Patent Literature 1: Unexamined Japanese Patent Application Publication No. 2000-116178

DISCLOSURE OF THE INVENTION

A motor drive device of the present invention controls driving a motor in accordance with an external command, and includes a drive controller, a limiter, a limit value generator, and a drive output section. The drive controller generates a drive signal for driving the motor, and the limiter limits a value of the drive signal within a range. The limit value generator generates a limit value, and the drive output section generates an energizing signal in response to an output signal supplied from the limiter for energizing the winding wires of the motor. The limit value generator adds an offset value to the drive signal, thereby generating a comparison signal, and then updates the limit value based on a size relation between the comparison signal and the limit value.

A method of driving a motor of the present invention controls driving the motor in accordance with an external command, and includes the steps below:

generating a drive signal for driving the motor;
limiting a value of the drive signal within a range;
generating a limit value; and
generating an energizing signal in response to an output signal that limits a value of the drive signal within a range and energizes the winding wires of the motor with the energizing signal.

The step of generating a limit value adds an offset value to the drive signal, thereby generating a comparison signal, and then updates the limit value based on a size relation between the comparison signal and the limit value.

The foregoing structure allows generating a limit value with ease. This limit value can limit a limiter output signal to be changed moderately when an rpm of the motor is changed, i.e. when a drive amount is changed. The motor drive device and the motor drive method of the present invention thus allow the rpm of the motor to increase slowly when a speed command is changed, so that the electric current at the change in drive amount can be reduced, and on top of that, the noises at the change in drive amount can be also reduced. In the case of lowering the speed of the motor, i.e. when a drive amount is reduced, the foregoing structure allows the rpm to lower slowly, so that an adverse influence by a regeneration phenomenon can be mitigated. Addition of an offset value to a drive signal allows carrying out a stable control in a regular condition without disturbing the control of the motor.

DETAILED DESCRIPTION OF THE PREFERRED EMBODIMENTS

Exemplary embodiments of the present invention are demonstrated hereinafter with reference to the accompanying drawings.

Embodiment 1

Figure 1:
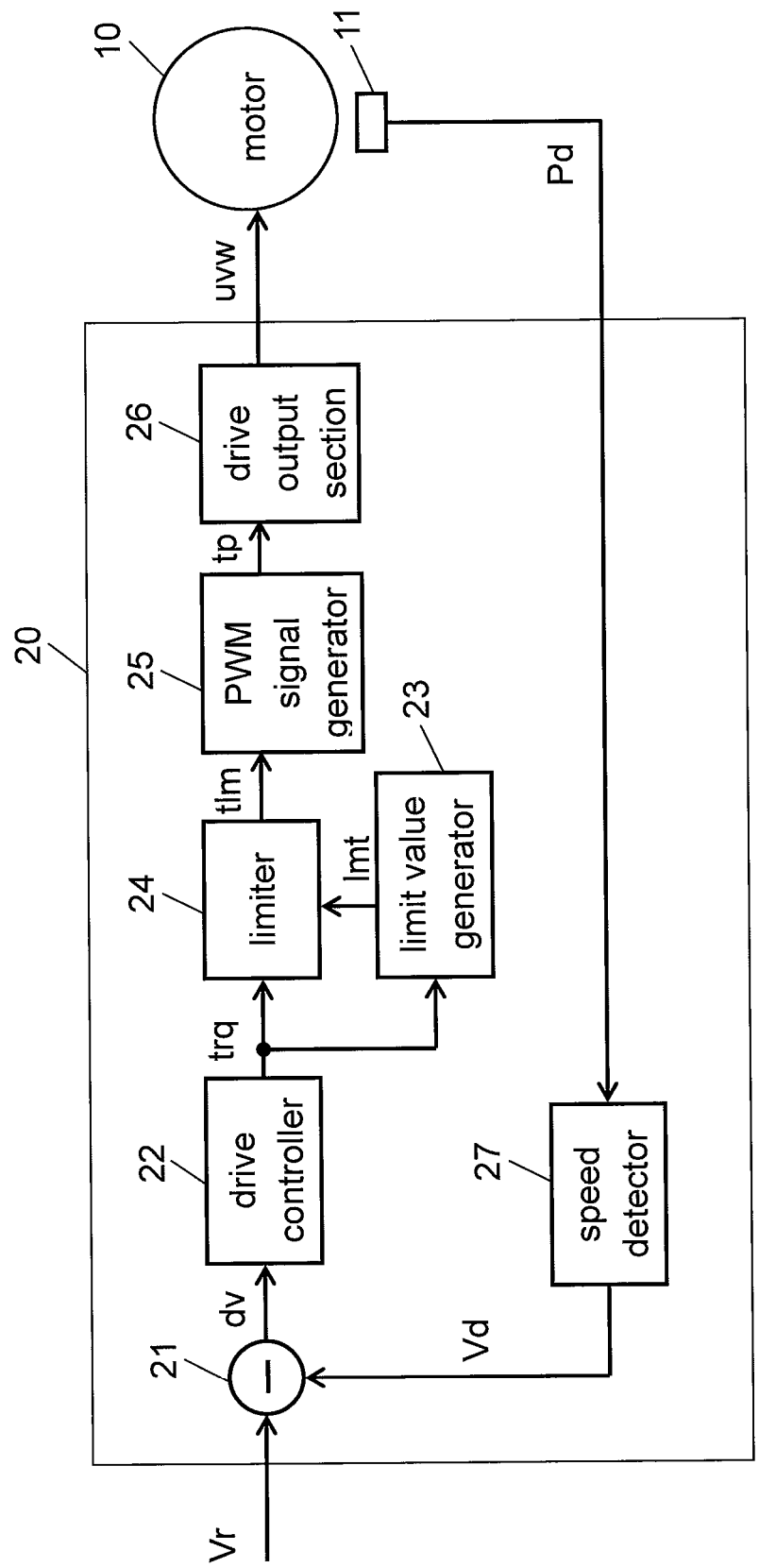
FIG. 1 is a block diagram illustrating a motor drive device in accordance with a first embodiment of the present invention.

FIG. 1 is a block diagram illustrating a structure of motor drive device 20 in accordance with the first embodiment of the present invention. As shown in FIG. 1, motor drive device 20 is connected to motor 10 and position detector 11. Motor 10 includes a stator (not shown) on which winding wires are wound, and a mover (not shown) to be rotated by energizing the winding wires. In this embodiment, motor 10 employs a brushless motor that includes three-phase winding wires, namely, phase U, phase V and phase W, and the respective phases are driven by a PWM signal (pulse-width modulated).

Position detector 11 detects a rotational position of a mover disposed within motor 10, and outputs a position sensing signal Pd in response to the rotational position. Motor drive device 20 receives a speed command signal Vr that indicates a command of the rpm of the mover. As shown in FIG. 1, motor drive device 20 includes subtracting unit 21, drive controller 22, limit value generator 23, limiter 24, PWM signal generator 25, drive output section 26, and speed detector 27.

Position detecting signal Pd from position detector 11 is supplied to speed detector 27, which then uses positional information indicated by signal Pd for detecting an rpm of the mover of motor 10 with the aid of, e.g. a positional change, and then outputs a speed detection signal Vd that indicates the detected speed. As discussed above, in the first embodiment, speed detection signal Vd, which indicates a speed of the mover, and speed command signal Vr, which indicates the speed commanded in order to control the rpm, are sent to motor drive device 20. Then motor drive device 20 carries out a feedback control based on speed detection signal Vd and speed command signal Vr such that the rpm of the mover can follow the speed command. The foregoing speed control system is thus available in motor drive device 20.

Subtracting unit 21 finds a difference between speed detection signal Vd and speed command signal Vr, whereby a deviation of a detected speed from the commanded speed is found. This deviation is supplied as speed deviation signal "dv" to drive controller 22.

Drive controller 22 implements a calculation, e.g. proportional integral relative to speed deviation signal "dv", and then generates and outputs drive signal "trq" for regulating the signal "dv" to be zero. Drive signal "trq" is supplied to limit value generator 23 and also limiter 24.

An example of the speed control system discussed above is demonstrated hereinafter. The example can be a positional control system in which drive signal "trq" is generated based on the deviation of a detected position signal from a position command signal, and signal "trq" is supplied to limit value generator 23 and limiter 24 for controlling a position of the mover of the motor.

Limiter 24 limits a value of drive signal "trq" within a range. To be more specific, limiter 24 regulates drive signal "trq" to be equal to or smaller than a given value. In this embodiment, when drive signal "trq" exceeds limit value "lmt", limiter 24 limits the value of drive signal "trq" to be limit value "lmt" before limiter 24 outputs the drive signal "trq". When drive signal "trq" does not exceed the limit value "lmt", limiter 24 outputs drive signal "trq" as it is. Limiter 24 supplies the signal processed as discussed above to PWM signal generator 25 as limiter output signal "tlm". Limit value generator 23 uses drive signal "trq", thereby generating limit value "lmt" and notifies limiter 24 of this limit value "lmt". This is detailed later.

PWM signal generator 25 generates PWM signal "tp" having undergone the pulse-width modulation in response to limiter output signal "tlm". To be more specific, a duty ratio of each pulse of PWM signal "tp" is set to a duty ratio in response to the value of limiter output signal "tlm". This PWM signal "tp" is supplied to drive output section 26. When drive signal "trq" is too small for limiter 24 to limit, the duty ratio in response to the drive signal "trq" is used, and when drive signal "trq" is limited, the duty ratio is limited in response to limit value "lmt".

Drive output section 26 generates energizing signals in response to PWM signal "tp" for each phase, and energizes and drives the winding wires of motor 10 with energizing signal UVW.

Motor drive device 20 is structure as discussed above, and a greater limiter output signal "tlm", namely, a greater deviation in speed, causes a greater duty ratio of PWM signal "tp" generated by PWM signal generator 25. A greater duty ratio of PWM signal "tp" allows a greater amount of energizing current to flow through the winding wires of the stator. In a case where speed command signal Vr is changed for increasing the rpm, the speed deviation changes to be greater and an drive amount relative to drive signal "trq" also changes to be greater, so that a greater amount of energizing current flows. In this embodiment, limit value generator 23 generates limit value "lmt" in order to prevent such an excessive current from flowing.

Limit value generator 23 that generates the foregoing limit value "lmt" is detailed hereinafter.

Figure 2:
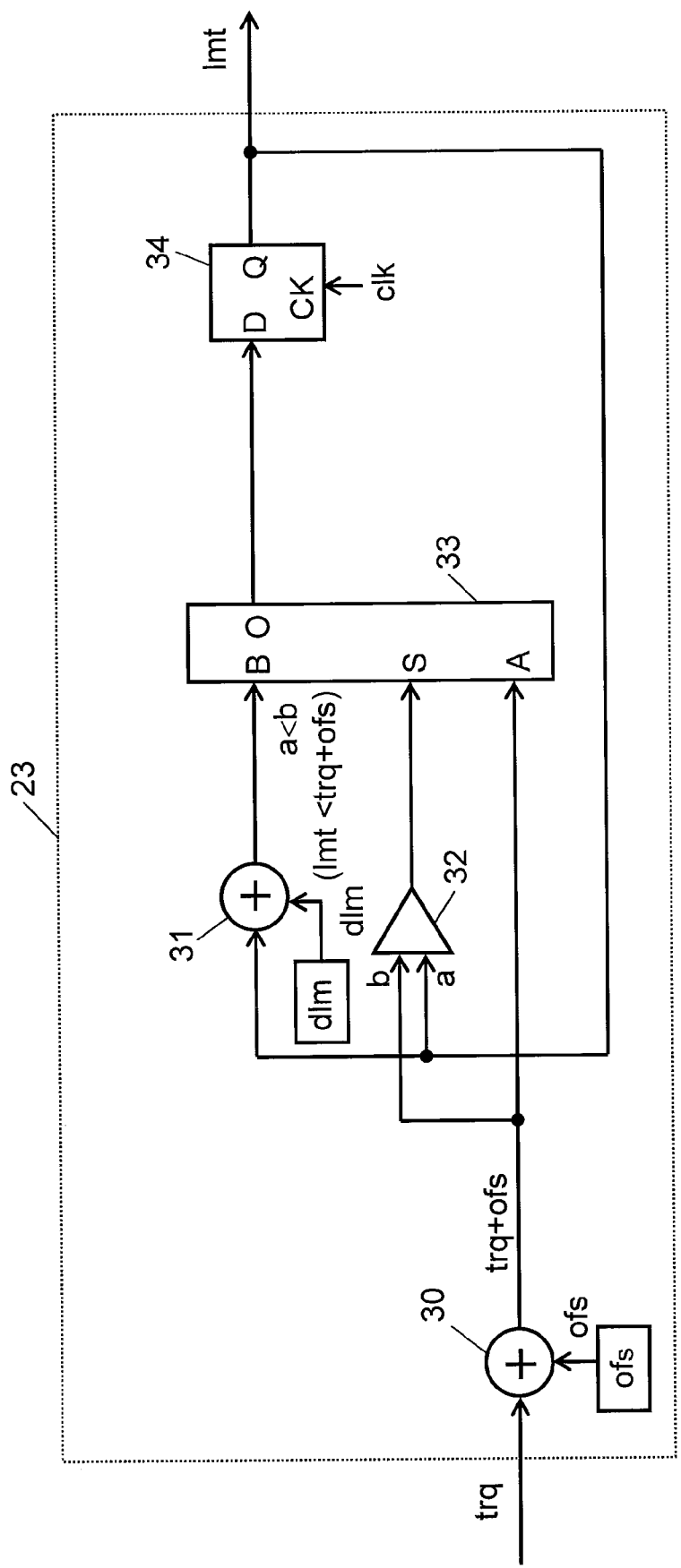
FIG. 2 is a block diagram of a limit value generator of the motor drive device shown in FIG. 1.

FIG. 2 is a block diagram of limit value generator 23 of motor drive device 20 in accordance with the first embodiment. Limit value generator 23 shown in FIG. 2 carries out a digital process by using a given cycle of a clock signal. To be more specific, drive signal "trq" is input as a data sequence having a value for every cycle of the clock signal, and limit value "lmt" is also generated in units of clock and is output as a value for every cycle of the clock signal.

As shown in FIG. 2, limit value generator 23 includes adders 30 and 31, comparator 32, selector 33, and latch 34. Drive signal "trq" supplied from drive controller 22 to limit value generator 23 is processed by those structural elements, and as a result, limit value "lmt" is generated. Limit value "lmt" is latched and retained by latch 34 in units of clock.

Drive signal "trq" supplied from drive controller 22 is firstly sent to adder 30 which adds a given offset value to drive signal "trq", and outputs this addition result as a comparison signal (trq+ofs), where offset value "ofs" is a positive number. This comparison signal (trq+ofs) will be used as a reference for comparison in comparator 32 which is described below. In this embodiment, limit value "lmt" is generated by using such a comparison signal (trq+ofs), i.e. drive signal "trq" plus offset value "ofs", whereby a stable control over the motor can be achieved in a regular state without disturbing the control of the motor. This will be detailed later. Comparison signal (trq+ofs) is also a data sequence of which value is changed in response to every cycle of a clock signal. In the following descriptions, the value of comparison signal (trq+ofs) at a certain cycle is described as a comparison value (trq+ofs).

Comparator 32 receives the foregoing comparison value (trq+ofs) and limit value "lmt" retained in latch 34, and compares these two values. The comparison result of comparator 32 is sent to selector 33, to which a value obtained by adding limit value "lmt" and a given change value "dlm" is supplied from adder 31 in addition to comparison value (trq+ofs), where change value "dlm" is a positive number. In response to the comparison result of comparator 32, selector 33 selects the value obtained by adding limit value "lmt" and change value "dlm" when limit value "lmt" supplied from latch 34 is smaller than comparison value (trq+ofs), or selects comparison value (trq+ofs) when limit value "lmt" from latch 34 is equal to or greater than comparison value (trq+ofs) before outputting the selected one. Change value "dlm" added by adder 31 is preferably smaller than offset value "ofs".

In FIG. 2, input terminal "a" of comparator 32 receives limit value "lmt", and input terminal "b" thereof receives comparison value (trq+ofs). Comparator 32 then compares the values at input terminals "a" and "b" with each other, and sends the comparison result to selection control terminal S of selector 33. In response to the value at terminal S, selector 33 outputs a value supplied to either one of input terminal A or B from output terminal O. In other words, limit value generator 23 prompts comparator 32 to determine the situation as "a<b" when limit value "lmt" supplied to input terminal "a" of comparator 32 is smaller than comparison value (trq+ofs) supplied to input terminal "b", and then selector 33 outputs the value obtained by adding limit value "lmt" and change value "dlm". To the contrary, when limit value "lmt" supplied to terminal "a" is equal to or greater than comparison value (trq+ofs) supplied to terminal "b", selector 33 outputs comparison value (trq+ofs) in response to the comparison result in comparator 32.

Latch 34 latches a value output from selector 33 at a clock timing. To be more specific, latch 34 receives a clock signal having a given cycle at its clock terminal CK, and latch 34 latches the value supplied from selector 33 at its input terminal D with a timing of the clock signal. The signal latched by latch 34 is output to limiter 24 as a new limit value "lmt" from output terminal Q of latch 34. This new limit value "lmt" is also supplied to comparator 32 and adder 31, whereby a next process in units of clock can be carried out.

As discussed above, limit value generator 23 generates the comparison signal formed by adding drive signal "trq" and offset value "ofs", and updates limit value "lmt" based on the size relation between the value of comparison signal (trq+ofs) and limit value "lmt". To be more specific, when limit value "lmt" is equal to or greater than present value (trq+ofs) of the comparison signal, generator 23 handles this present value (trq+ofs) as a new limit value "lmt", and when limit value "lmt" is smaller than present value (trq+ofs) of the comparison signal, generator 23 adds change value "dlm" to limit value "lmt", and handles this addition result as a new limit value "lmt".

Next, the action of limit value generator 23 and limiter 24 is detailed hereinafter.

Figure 3:
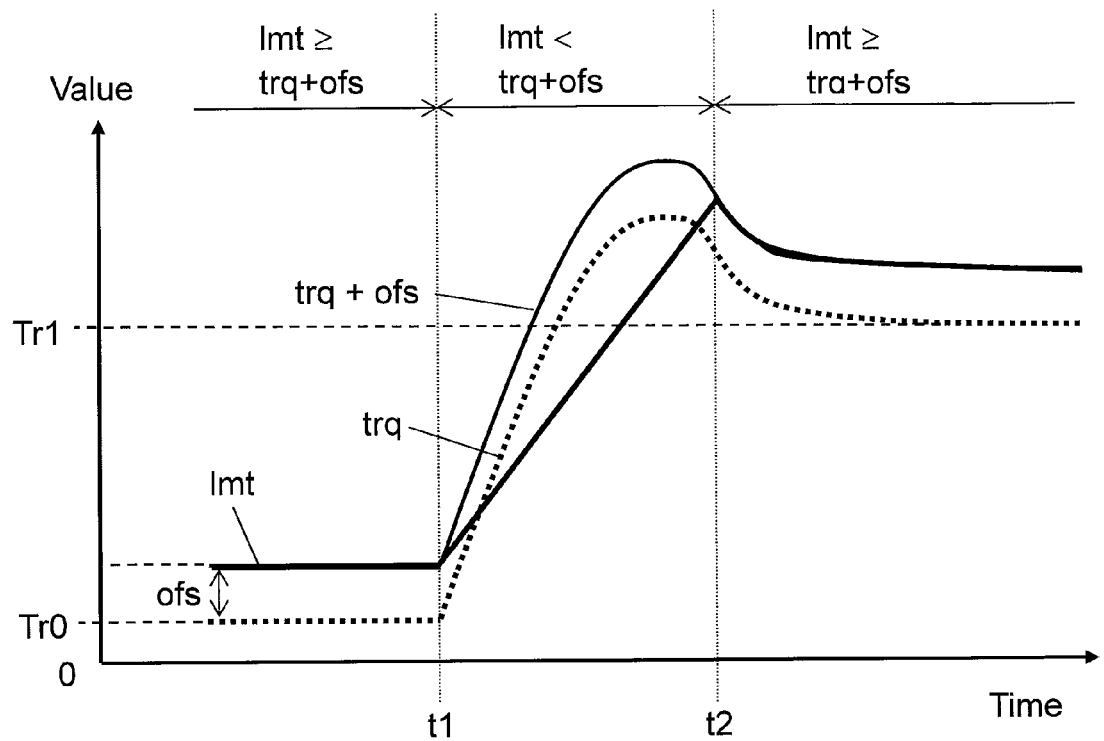
FIG. 3 shows waveforms illustrating changes in limit value of the motor drive device.
Figure 4:
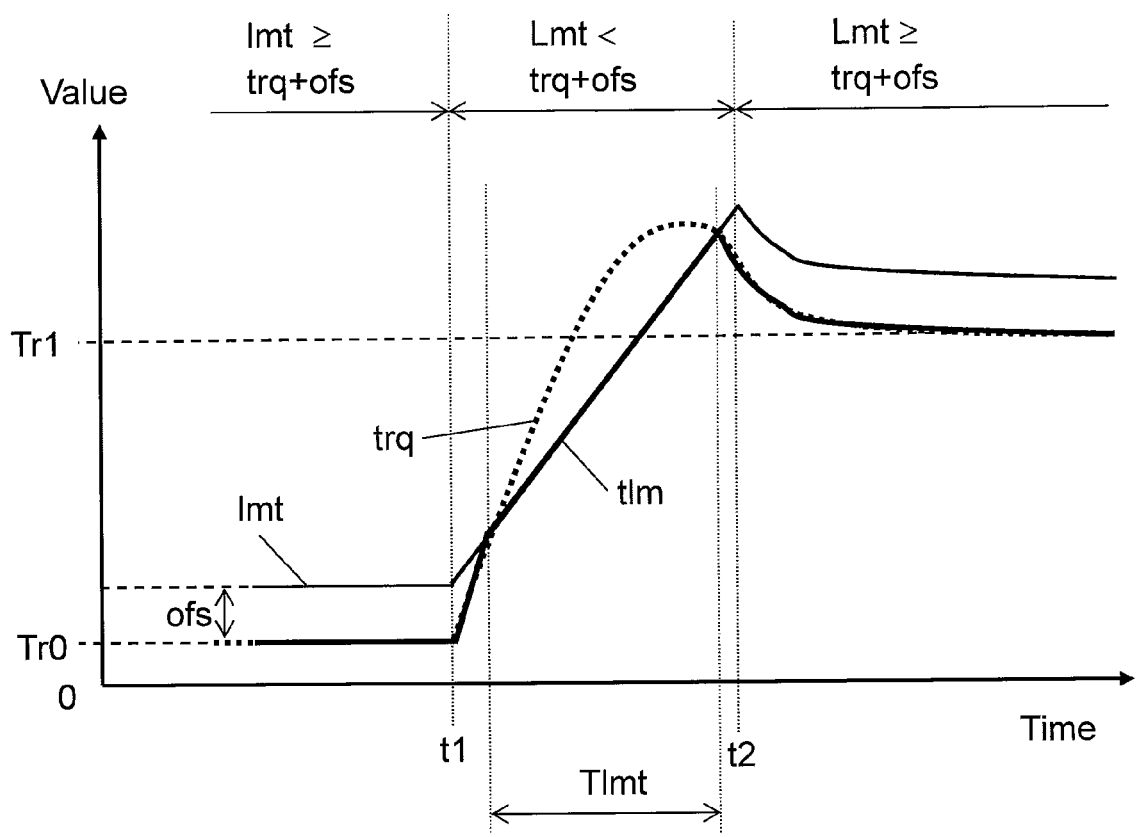
FIG. 4 shows waveforms of limiter output signals of the motor drive device.

FIG. 3 shows waveforms including changes of limit value "lmt" of motor drive device 20 in accordance with the first embodiment. FIG. 4 shows waveforms including limiter output signal "tlm" of motor drive device 20. In FIG. 3 and FIG. 4, an rpm is controlled such that the rpm corresponding to drive signal trq" having a value of Tr0 is changed by speed command signal Vr to the rpm corresponding to drive signal "trq" having a value of "Tr1". In other words, this example indicates a case where a drive amount changes such that the drive amount corresponding to drive signal "trq" can increase.

First, the action of generating limit value "lmt" by limit value generator 23 is demonstrated with reference to FIG. 3. In FIG. 3, drive signal "trq" is supplied as a constant value Tr0 to generator 23 until time "t1", then speed command signal Vr is changed to order a higher speed, and in response to this command change, drive signal "trq" starts increasing sharply from time "t1". Drive signal "trq" temporarily passes over an overshoot period where the value exceeds convergence value Tr1, and then converges on convergence value Tr1. Since comparison value (trq+ofs) is a result of adding offset value "ofs" to drive signal "trq", it changes in response to drive signal "trq" as shown in FIG. 3.

During the period until time "t1", comparison value (trq+ofs) is equal to limit value "lmt", so that selector 33 selects comparison value (trq+ofs). As a result, the value obtained by adding offset value "ofs" to drive signal "trq" is supplied as limit value "lmt" to limiter 24 during the period until time "t1".

Next, at time "t1", drive signal "trq" drastically increases, so that every time a new value of drive signal "trq" is supplied, the value of the new one increases, which involves increasing new comparison value (trq+ofs). As a result, new comparison value (trq+ofs) becomes greater than present limit value "lmt" output from latch 34. Selector 33 thus selects the value obtained by adding change value "dlm" to present limit value "lmt", and this selected value is output as a new limit value "lmt" from latch 34. To be more specific, in FIG. 3, during the period from time "t1" to time "t2", the new comparison value (trq+ofs) stays greater than present limit value "lmt", so that the characteristics of limit value "lmt" increases by a change value "dlm" at every unit of clock.

Next, during the period after time "t2", drive signal "trq" decreases, so that new comparison value (trq+ofs) becomes equal to or smaller than present limit value "lmt" output from latch 34. Selector 33 thus selects comparison value (trq+ofs), as a result, after time "t2", the value of adding offset value "ofs" to drive signal "trq" is supplied as limit value "lmt" to limiter 24.

As discussed above, when an rpm is changed to a higher one, limit value "lmt" as shown in FIG. 3 is supplied to limiter 24.

FIG. 4 shows drive signal "trq" that is input to limiter 24, limit value "lmt", and limiter output signal "tlm". As shown in FIG. 4, during period of Tlmt, drive signal "trq" is limited by limit value "lmt" before it is output. Greater drive signal "trq" causes a greater electric current flowing through the winding wires of the motor. However, motor drive device 20 in accordance with this embodiment allows regulating drive signal "trq" to increase slowly when the speed of the motor is changed as shown in FIG. 4. An excessive current such as a rush current can be thus prevented when the speed of the motor is changed. Since limiter output signal "tlm" increases slowly when the rpm of the motor is changed, the noises at the regulation can be lowered, and shocks to the mechanical part of the motor can be mitigated. The foregoing discussion refers to the case where the present invention is applied to the speed control system; however, it can be applied to a positional change in a position control system. In short, the present invention is applicable to a structure in which the mover of the motor can be moved in response to a change in drive amount, and the present invention in this case can produce an advantage similar to what is discussed previously.

The foregoing discussion refers to a structure that allows limit value generator 23 to generate limit value "lmt" through digital processing in the respective function blocks; however, those processes can be done by a program. For instance, the functions of subtracting unit 21, drive controller 22, limit value generator 23, limiter 24, PWM signal generator 25, and speed detector 27 listed in FIG. 1 can be programmed and stored in a memory for a microprocessor to implement this program. The embodiment of the present invention can be done this way. To be more specific, a motor driving method comprising the following steps can be implemented by the microprocessor. The method includes the steps of:

generating a drive signal for driving a motor;
limiting a value of the drive signal within a range;
generating a limit value; and
generating an energizing signal in response to an output signal that limits the value of the drive signal within a range, and energizing the winding wires of the motor with the energizing signal,
wherein the step of generating a limit value generates a comparison signal in which an offset value is added to the drive signal, and then updates the limit value based on a size relation between a value of the comparison signal and the limit value.

Figure 5:
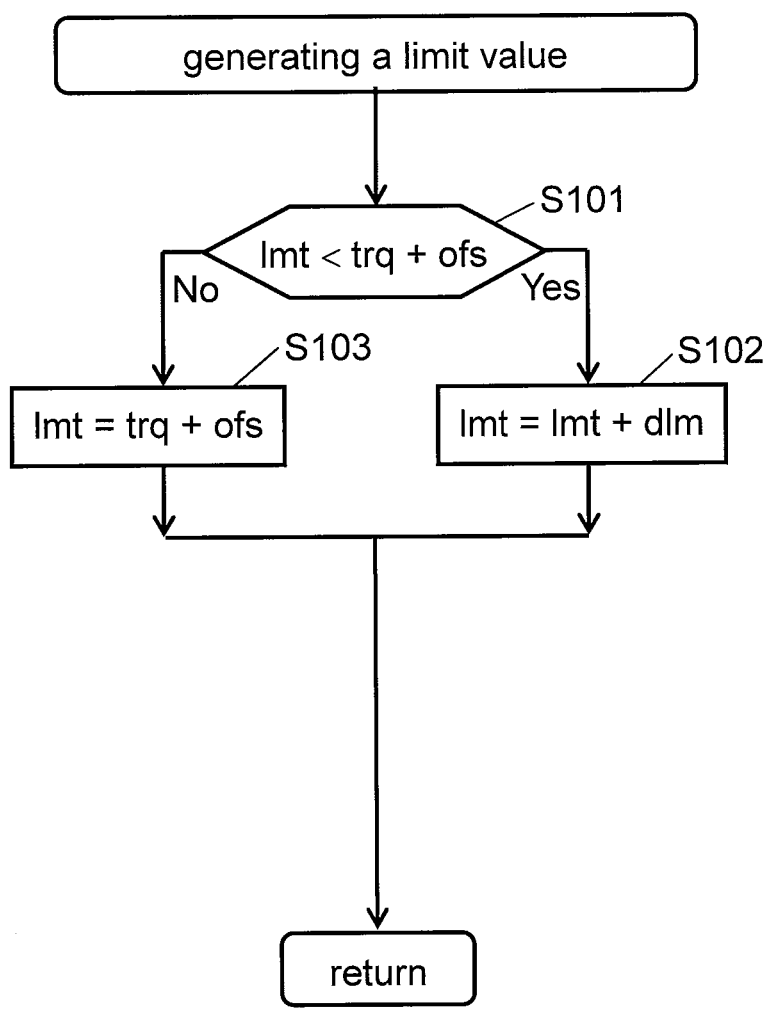
FIG. 5 is a flowchart of a generating process of a limit value of the motor drive device.

FIG. 5 is a flowchart illustrating the steps of generating limit value "lmt" by motor drive device 20 in accordance with the first embodiment. Limit value generator 23 can be structured to generate a limit value that carries out the steps following the flowchart shown in FIG. 5.

Firstly in step S101, limit value generator 23 compares limit value "lmt" with comparison value (trq+ofs). When limit value "lmt" is smaller than comparison value (trq+ofs), i.e. goes along the negative branch from step S101, change value "dlm" is added to limit value "lmt", thereby forming new limit value "lmt" in step S102. When limit value "lmt" is equal to or greater than comparison value (trq+ofs), i.e. goes along the positive branch from step S101, comparison value (trq+ofs) is handled as new limit value "lmt" in step S103.

As discussed above, limit value "lmt" is updated to new limit value "lmt", and then the step, e.g. returns to an original calling step. Limit value generator 23 repeats the foregoing process, whereby limit value "lmt" can be generated.

Limit value generator 23 in accordance with this embodiment thus generates comparison signal (trq+ofs) by adding offset value "ofs" having a positive value to drive signal "trq", and then updates limit value "lmt" based on a size relation between comparison signal (trq+ofs) and limit value "lmt". When drive signal "trq" exceeds limit value "lmt", limiter 24 controls drive signal "trq" to be equal to limit value "lmt". When limit value "lmt" is equal to or greater than comparison signal (trq+ofs), limit value generator 23 handles the value of comparison signal (trq+ofs) as new limit value "lmt", and when limit value "lmt" is smaller than comparison value (trq+ofs), a given value "dlm" is added to limit value "lmt", and this resultant value is handled as new limit value "lmt".

The foregoing structure allows regulating limiter output signal "tlm" to increase moderately when the rpm of motor 10 is changed, i.e. a drive amount is changed. As a result, when the drive amount is changed, an increase in the electric current of motor 10 can be reduced, and at the same time, noises at the change can be also reduced.

Embodiment 2

Figure 6:
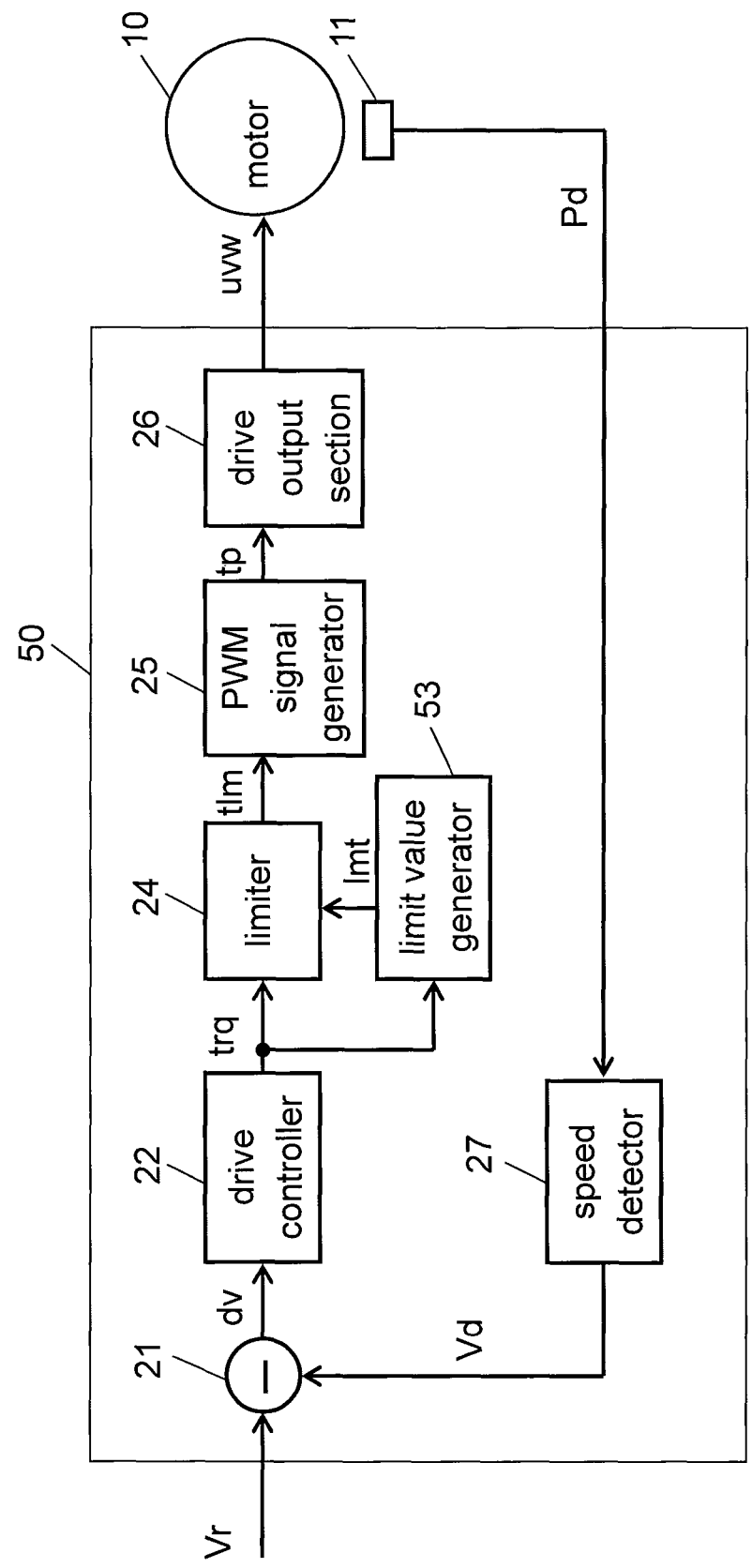
FIG. 6 is a block diagram illustrating a motor drive device in accordance with a second embodiment of the present invention.

FIG. 6 is a block diagram illustrating a structure of motor drive device 50 in accordance with the second embodiment of the present invention. Device 50 includes limit value generator 53 different from limit value generator 23 of motor drive device 20 shown in FIG. 1 and in accordance with embodiment 1.

Figure 7:
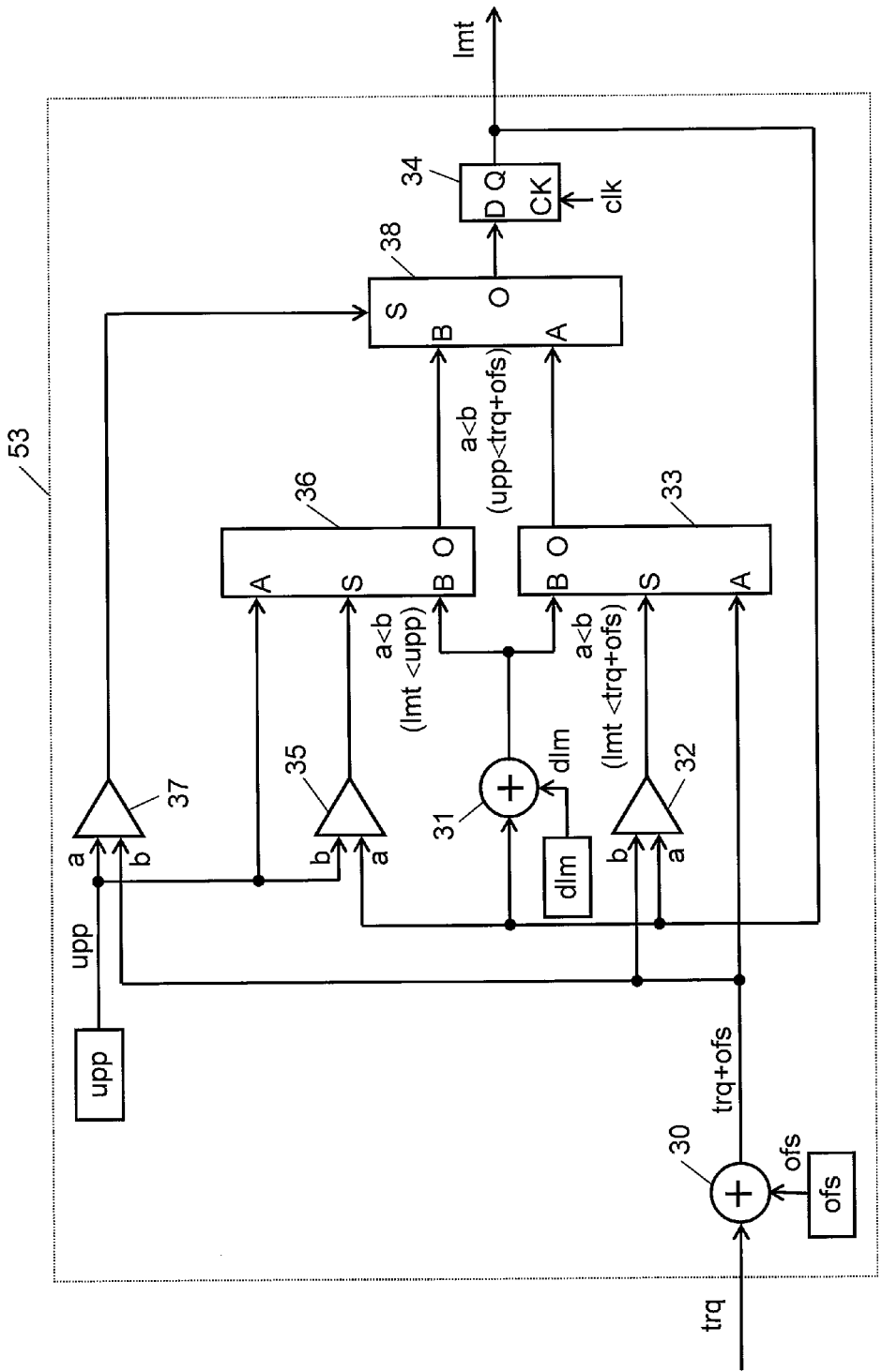
FIG. 7 is a block diagram of a limit value generator of the motor drive device shown in FIG. 6.

FIG. 7 is a block diagram of limit value generator 53 of motor drive device 50 in accordance with embodiment 2. Generator 53 has a function of limiting an upper limit of drive signal "trq" in addition to the functions of limit value generator 23 in accordance with embodiment 1. Structural elements similar to those of embodiment 1 have the same reference marks, and the detailed descriptions thereof are omitted here.

Limit value generator 53 shown in FIG. 7 further includes comparators 35, 37, selectors 36, 38. On top of that, upper limit value "upp", indicating an upper limit of limit value "lmt", is set in limit value generator 53. Since upper limit value "upp" sets an upper limit of limit value "lmt", a rather great value is assigned to "upp".

In FIG. 7, comparator 35 receives limit value "lmt" supplied from latch 34 at input terminal "a", and upper limit value "upp" at input terminal "b". Comparator 35 compares these two values, and sends the comparison result to selection control terminal S of selector 36. Selector 36 outputs either one of the values, received at its terminal "A" or "B", from output terminal O in response to a value at selection control terminal S. To be more specific, when limit value "lmt" received at input terminal "a" of comparator 35 is smaller than upper limit value "upp" received at input terminal "b", comparator 35 determines the situation as a<b, and then selector 36 outputs a value of adding change value "dlm" to limit value "lmt". To the contrary, when limit value "lmt" received at input terminal "a" is equal to or greater than upper limit value "upp" received at input terminal "b", selector 36 outputs upper limit value "upp" in response to the result determined by comparator 35.

Comparator 37 receives upper limit value "upp" at input terminal "a" and comparison value (trq+ofs) at input terminal "b", and then comparator 37 compares these two values before it sends the comparison result to selection control terminal S of selector 38. Selector 38 outputs either one of the values received at its terminal "A" or "B" from output terminal O in response to a value at selection control terminal S. To be more specific, when upper limit value "upp" received at input terminal "a" of comparator 37 is smaller than comparison value (trq+ofs) received at input terminal "b", comparator 37 determines the situation as a<b, and then selector 38 outputs an output value of selector 36. To the contrary, when upper limit value "upp" received at input terminal "a" is equal to or greater than comparison value (trq+ofs) received at input terminal "b", selector 38 outputs an output value from selector 33 in response to the result determined by comparator 37.

The value output from selector 38 is latched by latch 34 at a clock timing, then this latched signal is supplied to limiter 24 as new limit value "lmt", which is also supplied to comparator 32, adder 31, and comparator 35. This mechanism allows the next process to be carried out in units of clock.

The foregoing structure of limit value generator 53 allows carrying out the same process as that carried out in embodiment 1 when present comparison value (trq+ofs) is equal to or smaller than upper limit value "upp". In other words, when limit value "lmt" is equal to or greater than present comparison value (trq+ofs), the present comparison value is handled as a new limit value "lmt". When limit value "lmt" is smaller than present comparison value (trq+ofs), a value of adding change value "dlm" to limit value "lmt" is handled as new limit value "lmt".

On the other hand, when present comparison value (trq+ofs) is greater than upper limit value "upp", limit value generator 53 carries out the following process: When limit value "lmt" is equal to or greater than upper limit value "upp", this upper limit value "upp" is handled as new limit value "lmt". When limit value "lmt" is smaller than upper limit value "upp", a value of adding change value "dml" to limit value "lmt" is handled as new limit value "lmt".

Figure 8:
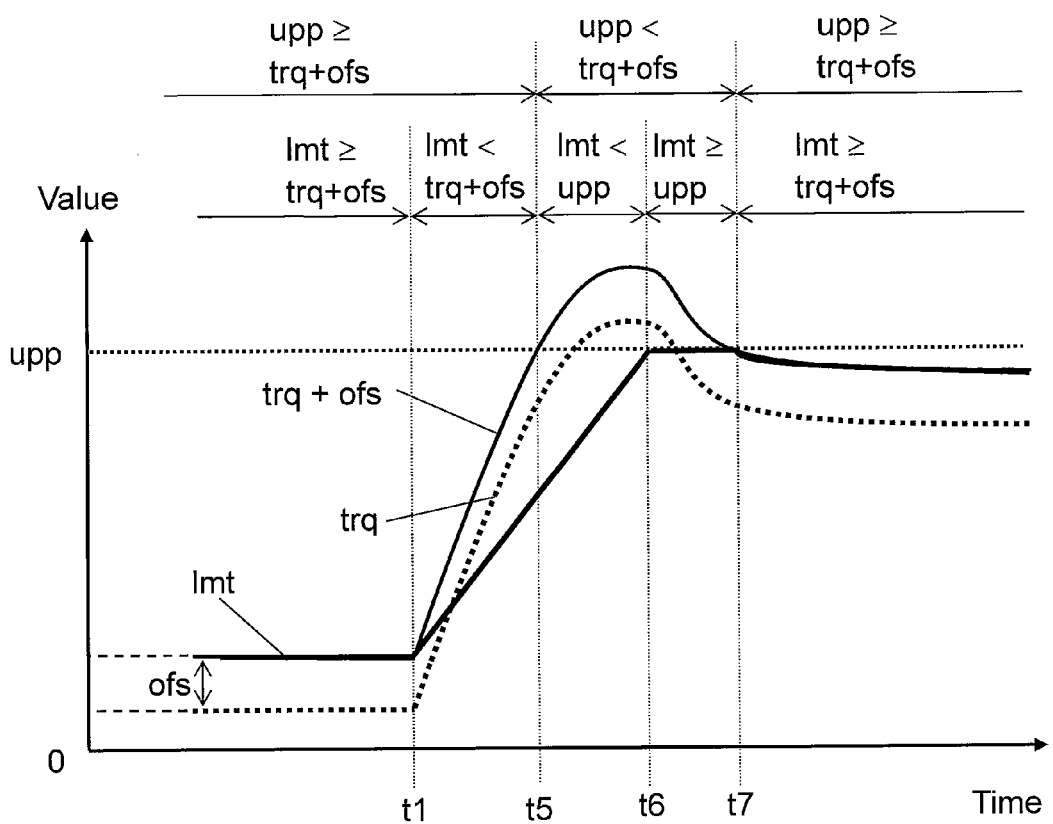
FIG. 8 shows waveforms illustrating changes in limit value of the motor drive device.
Figure 9:
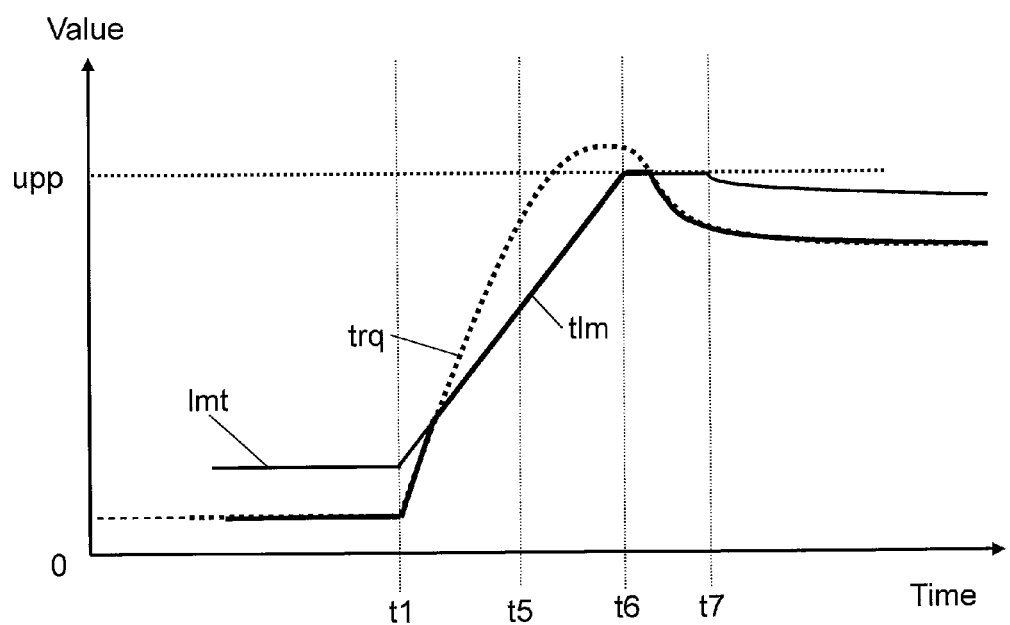
FIG. 9 shows waveforms of limiter output signals of the motor drive device.

FIG. 8 shows waveforms including changes in limit values of motor drive device 50 in accordance with the second embodiment, and FIG. 9 shows waveforms including limiter output signal "tlm" of motor drive device 50. FIGS. 8 and 9 show an example of speed control that changes an rpm to a higher one with speed control signal Vr. A similar speed control has been done as shown in FIGS. 3 and 4.

In FIG. 8, drive signal "trq" is supplied to limit value generator 53 as a constant value until time "t1", and when speed command signal Vr changes the speed to be higher, drive signal "trq" starts increasing sharply from time "t1" in response to this change, drive signal "trq" temporarily passes over an overshoot period where the value exceeds a convergence value, and then converges on the convergence value. Comparison value (trq+ofs) changes as shown in FIG. 8 in response to drive signal "trq".

In the period until time "t1", at first, upper limit value "upp" is equal to or greater than comparison value (trq+ofs), which is equal to limit value "lmt", so that selector 38 selects the output from selector 33, which then selects comparison value (trq+ofs). As a result, the value of adding offset value "ofs" to drive signal "trq" is supplied as limit value "lmt" to limiter 24 during the period until time "t1".

Next, at time "t1", drive signal "trq" drastically increases, so that every time a new drive signal "trq" is supplied, the value of the new one increases, which involves increasing new comparison value (trq+ofs). As a result, new comparison value (trq+ofs) becomes greater than present limit value "lmt" output from latch 34. Selector 33 thus selects a value of adding change value "dlm" to present limit value "lmt". On the other hand, during the period from time "t1" to time "t5", upper limit value "upp" is equal to or greater than comparison value (trq+ofs), so that selector 38 selects the output from selector 33. As a result, the value of adding present limit value "lmt" and change value "dlm" is output from latch 34 as a new limit value "lmt".

Next, when the time passes time "t5", upper limit value "upp" becomes smaller than comparison value (trq+ofs), and selector 38 selects an output from selector 36. Since limit value "lmt" is smaller than upper limit value "upp", selector 36 selects the value of adding present limit value "lmt" and change value "dlm". As a result, during the period from time "t5" to time "t6", the value of adding present limit value "lmt" and change value "dlm" is output from latch 34 as a new limit value "lmt". In other words, during the period from time "t1" to time "t6" in FIG. 8, limit value "lmt" increases by change value "dlm" every clock unit.

When the time arrives at time "t6", limit value "lmt" becomes equal to upper limit value "upp", so that selector 36 selects upper limit value "upp" and then outputs it. During the period from time "t6" to time "t7, upper limit value "upp" is smaller than comparison value (trq+ofs), so that selector 38 selects the output from selector 36. As a result, during the period from time "t6" to time "t7", upper limit value "upp" is output from latch 34 as limit value "lmt". This process allows limiting the limit value "lmt" to upper limit value "upp" during the period from time "t6" to time "t7".

Next, the period from time "t7" and onward, upper limit value "upp" becomes equal to or greater than comparison value (trq+ofs), so that selector 38 selects the output from selector 33. On the other hand, a reduction in drive signal "trq" causes a new comparison value (trq+ofs) to be equal to or smaller than the present limit value "lmt", and thus selector 33 selects comparison value (trq+ofs). This process allows supplying the value of adding drive signal "trq" and offset value "ofs" to limiter 24 as limit value "lmt" during the period from time "t7" and onward.

As discussed above the operation of limit value generator 53, when an rpm is changed to a higher one, limit value "lmt" as shown in FIG. 8 is supplied to limiter 24.

FIG. 9 shows drive signal "trq" supplied to limiter 24, limit value "lmt", and limiter output signal "tlm". As shown in FIG. 9, a peak value of limiter output signal "tlm" is limited to upper limit value "upp" in comparison with limiter output signal "tlm" shown in FIG. 4, so that an excessive electric current, e.g. a rush current flowing when the speed of the motor is changed, can be further reduced.

This second embodiment refers to an example that applies a speed control system to the present invention; however, the present invention is not limited to this example. For instance, a structure that moves the mover of the motor by changing the drive amount is applicable to the present invention with an advantage similar to what is discussed previously.

As discussed above, limit value generator 53 generates limit value "lmt" through a digital process by using respective functional blocks; however, as described in embodiment 1, it is more general to implement the foregoing process based on a procedure such as a program. To be more specific, the respective functions shown in FIG. 6 are stored as a program in a memory, and a microprocessor implements the program for driving the motor.

Figure 10:
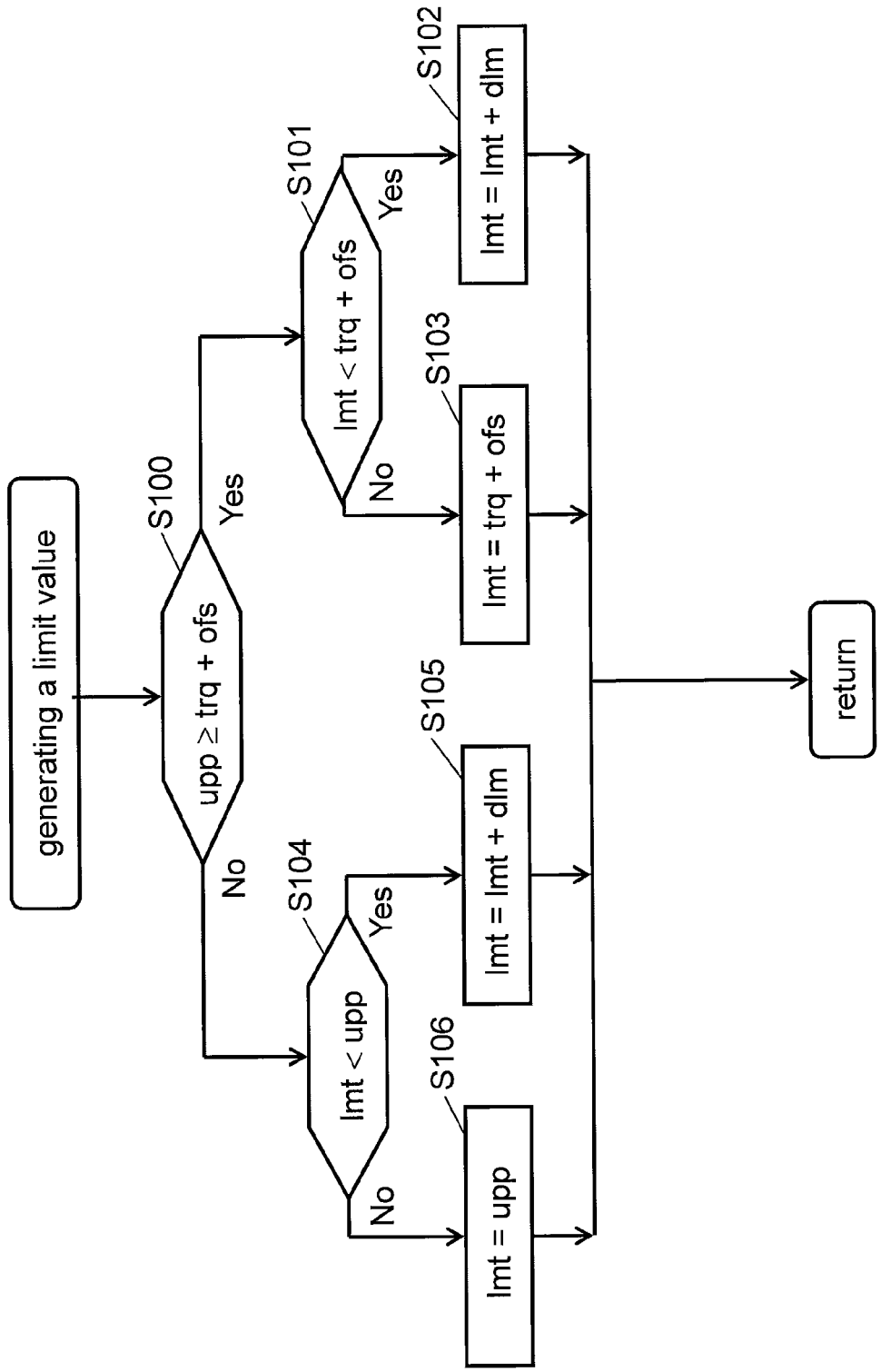
FIG. 10 is a flowchart of a generating process of a limit value of the motor drive device.

FIG. 10 is a flowchart of a generating process of limit value "lmt" of motor drive device 50 in accordance with the second embodiment. Limit value generator 53 can include the steps of generating a limit value that carries out the process shown in the flowchart.

Limit value generator 53 compares upper limit value "upp" with comparison value (trq+ofs) in step S100, and proceeds to step S101 when upper limit value "upp" is equal to or greater than comparison value (trq+ofs). When upper limit value "upp" is smaller than comparison value (trq+ofs), the step proceeds to step S104.

In step S101, limit value generator 53 compares limit value "lmt" with comparison value (trq+ofs), and when limit value "lmt" is smaller than comparison value (trq+ofs), the value obtained by adding limit value "lmt" and change value "dlm" is handled as a new limit value "lmt" in step S102. When limit value "lmt" is equal to or greater than comparison value (trq+ofs), comparison value (trq+ofs) is handled as a new limit value "lmt" in step S103.

In step S104, limit value generator 53 compares limit value "lmt" with upper limit value "upp", and when limit value "lmt" is smaller than upper limit value "upp", the value obtained by adding limit value "lmt" and change value "dlm" is handled as a new limit value "lmt" in step S105. When limit value "lmt" is equal to or greater than upper limit value "upp", upper limit value "upp" is handled as a new limit value "lmt" in step S106.

As discussed above, limit value generator 53 updates limit value "lmt" to a new one, and then the step returns to, e.g. an original calling step. The repeat of the foregoing steps by limit value generator 53 can also generate limit value "lmt" as shown in FIG. 8.

Figure 11:
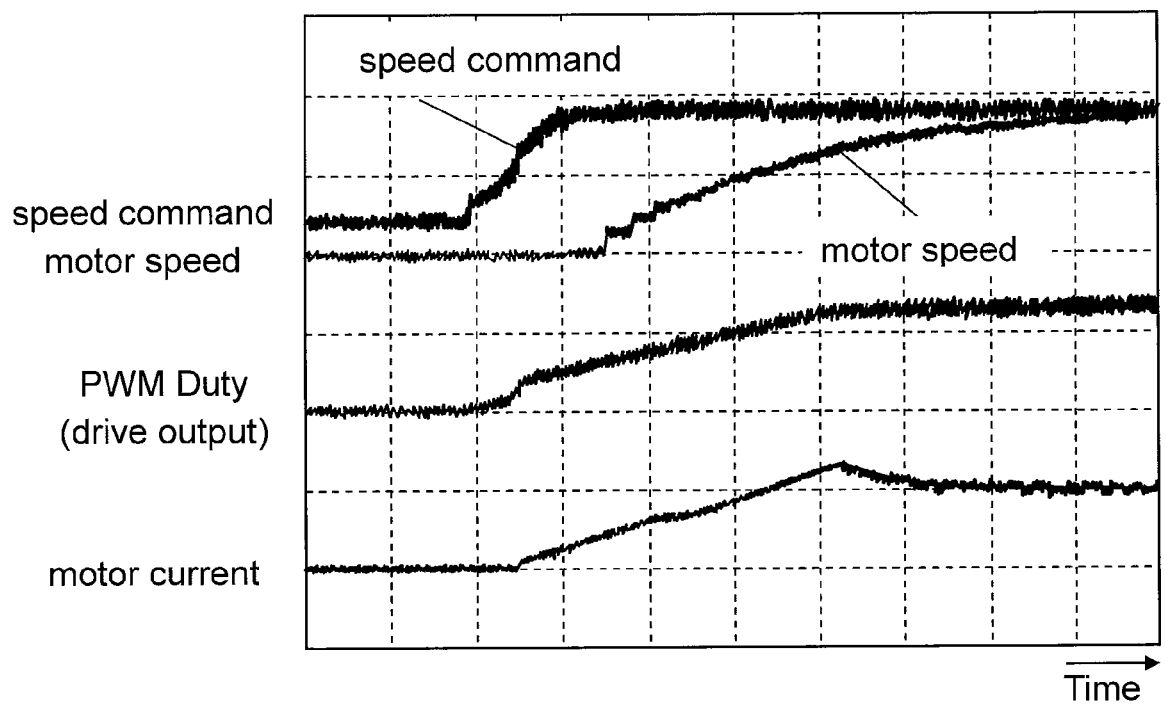
FIG. 11 shows results of measuring an electric current when a speed of the motor drive device is changed.
Figure 20:
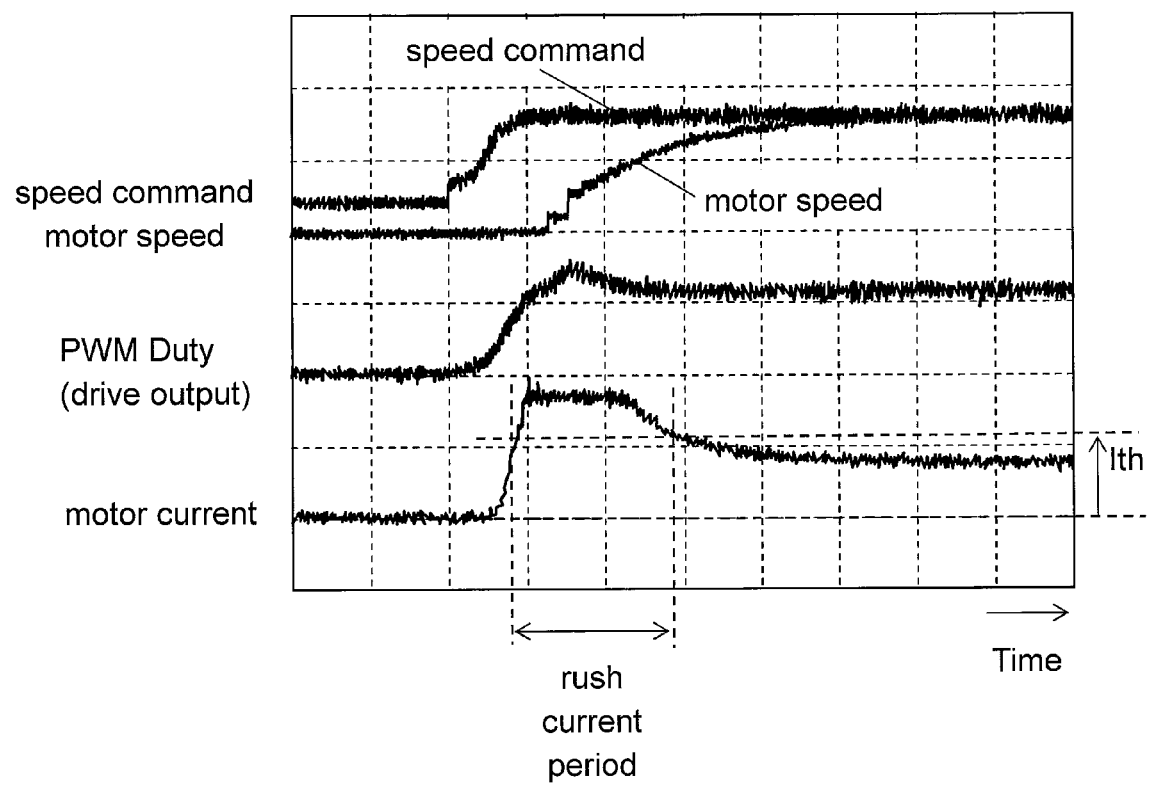
FIG. 20 shows a result of measuring a rush current when a speed of a conventional motor is changed.

FIG. 11 shows results of measuring an electric current when a speed of motor drive device 50 in accordance with the second embodiment is changed. In FIG. 11, the upper waveform indicates speed command signal Vr and an actual speed of the motor in response to the command signal. The middle waveform indicates changes in the duty ratio of PWM signal "tp", and the lower waveform indicates changes in the electric current running through the motor when the speed is changed as is shown in the upper waveform. Comparing with the electric current flowing through the conventional motor shown in FIG. 20, it is apparent that the current increases slowly in response to the speed changed by motor drive device 50. At the same time, motor drive device 50 allows shortening a rush current period, i.e. a period of an excessive current, shown in FIG. 20.

Limit value generator 53 in accordance with the second embodiment, as discussed above, adds offset value "ofs" having a positive value to drive signal "trq", thereby generating comparison signal (trq+ofs), and then updates limit value "lmt" based on a size relation between the value of comparison signal (trq+ofs) and limit value "lmt". Limiter 24 limits drive signal "trq" to be equal to limit value "lmt" when drive signal "trq" exceeds limit value "lmt". In this second embodiment, when limit value "lmt" is equal to or greater than comparison signal (trq+ofs), limit value generator 53 handles the value of comparison signal (trq+ofs) as a new limit value "lmt", and when limit value "lmt" is smaller than the value of comparison signal (trq+ofs), generator 53 handles the value of limit value "lmt" plus a given value "dlm" as a new limit value "lmt". On top of that, limit value generator 53 sets upper limit value "upp" indicating the upper limit of limit value "lmt". When the value of comparison signal (trq+ofs) is greater than upper limit value "upp", and limit value "lmt" is equal to or greater than upper limit value "upp", which is then handled as a new limit value "lmt". When the value of comparison signal (trq+ofs) is greater than upper limit value "upp", and limit value "lmt" is smaller than upper limit value "upp", the value of limit value "lmt" plus the given value "dlm" is handled as a new limit value "lmt".

The foregoing structure allows limiter output signal "tlm" to increase slowly when the drive amount is changed, e.g. when the speed of motor 10 is changed. As a result, an increase in the electric current at the change of drive amount can be lowered, and the noises at the change of drive amount can be also lowered.

Embodiment 3

Figure 12:
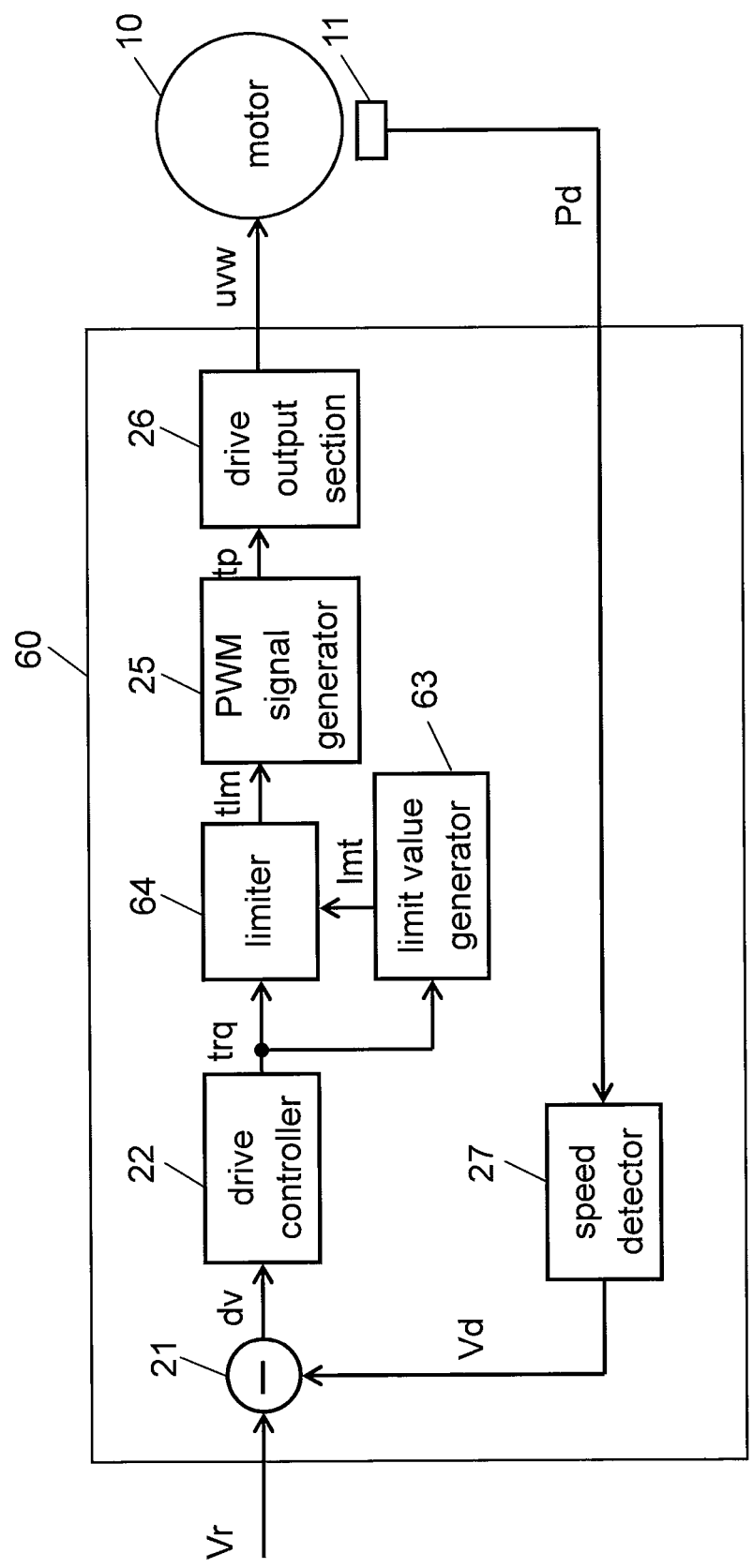
FIG. 12 is a block diagram illustrating a motor drive device in accordance with a third embodiment of the present invention.

FIG. 12 is a block diagram illustrating a structure of motor drive device 60 in accordance with the third embodiment of the present invention. Device 60 includes limiter 64 and limit value generator 63 both different from those of the motor drive device in accordance with embodiment 1. Structural elements similar to those in embodiment 1 have the same reference marks and the detailed descriptions thereof are omitted here.

In third embodiment, limiter 64 controls drive signal "trq" to be equal to or greater than a give value, thereby limiting the value of drive signal "trq" within a range. To be more specific, limiter 64 limits the value of drive signal "trq" to be limit value "lmt" before outputting the drive signal when the value of drive signal "trq" is smaller than limit value "lmt". When drive signal "trq" exceeds limit value "lmt", limiter 64 outputs drive signal "trq" as it is. Limiter 64 supplies the signal processed above to PWM signal generator 25 as limiter output signal "tlm". Limit value generator 64 generates limit value "lmt" by using drive signal "trq" so that limiter 64 can limit drive signal "trq" as discussed above.

When a speed of a motor, of which speed is controllable, is changed from a stable operation to a lower speed, the motor works as an electric dynamo and generates an induction voltage. In other words, the motor supplies electric power produced by the induction voltage to its power supply and drive circuit which are originally supposed to supply the power to the motor. This is known as a regeneration phenomenon.

Figure 13:
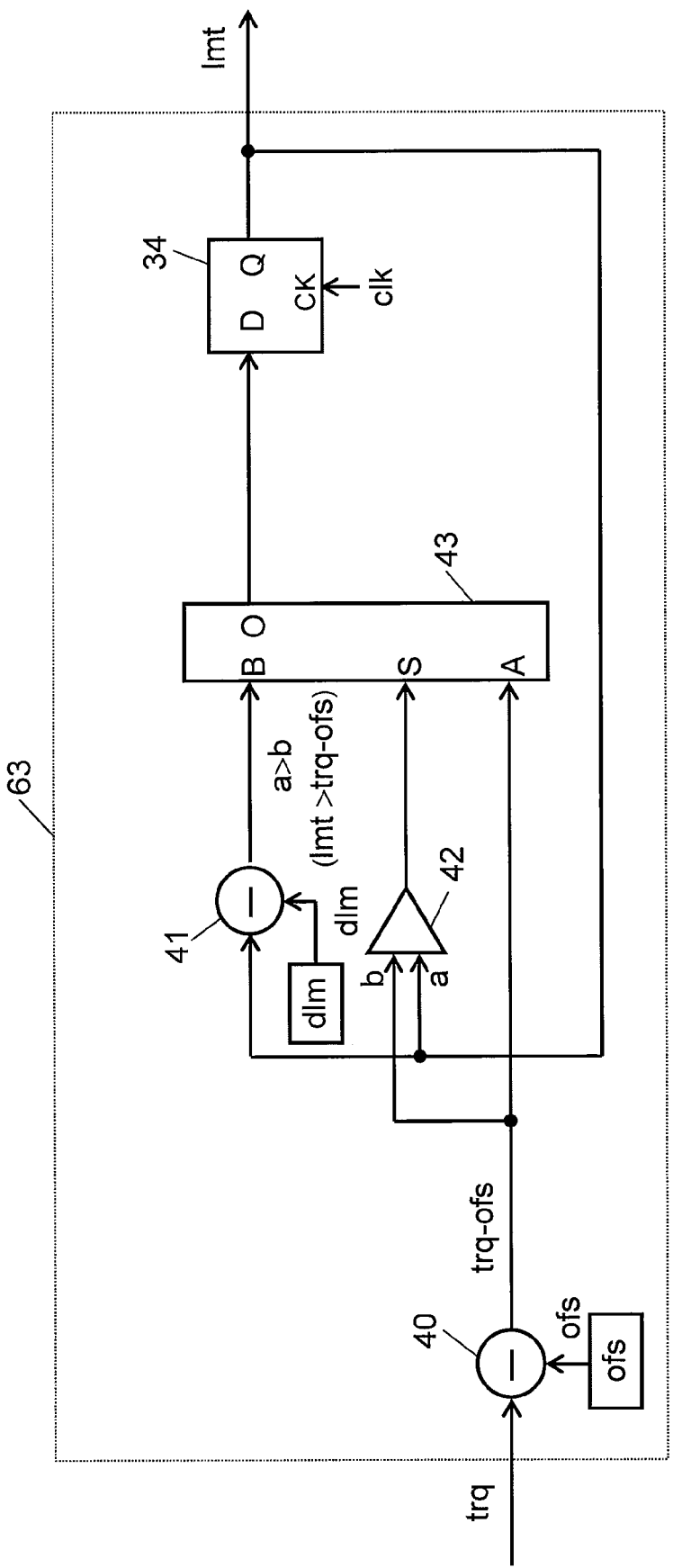
FIG. 13 is a block diagram of a limit value generator of the motor drive device shown in FIG. 12.

FIG. 13 is a block diagram of limit value generator 63 of motor drive device 60 in accordance with the third embodiment, and this generator 63 has a structure similar to that of limit value generator 23 in accordance with the first embodiment, so that it carries out digital process at a given cycle of a clock signal. As FIG. 13 shows, generator 63 includes subtraction units 40, 41, comparator 42, selector 43, and latch 34.

Drive controller 22 supplies drive signal "trq" to subtraction unit 40 which subtracts a given offset value "ofs" from drive signal "trq", and outputs this subtraction result as comparison signal (trq−ofs). Offset value "ofs" has a positive value. Comparison signal (trq−ofs) can be obtained by adding a negative value of "−ofs" to drive signal "trq". The value of comparison signal (trq−ofs) at a certain time is described as comparison value (trq−ofs) also in this embodiment.

Comparator 42 receives this comparison value (trq−ofs) and limit value "lmt" retained by latch 34, and comparator 42 compares these two values and inform selector 43 of the comparison result. Selector 43 also receives a value obtained by subtracting a given change value "dlm" (this subtraction is done by subtraction unit 41) from limit value "lmt" in addition to comparison value (trq−ofs). This change value "dlm" has a positive value. Instead of using the value of subtracting the given change value "dlm" from limit value "lmt", the value of adding limit value "lmt" and a negative change value of "−dlm" can be used. In response to the comparison result supplied from comparator 42, selector 43 selects the value of subtracting the given change value "dlm" from limit value "lmt" when limit value "lmt" supplied from latch 34 is greater than comparison value (trq−ofs). When limit value "lmt" supplied from latch 34 is equal to or smaller than comparison value (trq−ofs), selector 43 selects comparison value (trq−ofs) and outputs it. Change value "dlm" subtracted by subtraction unit 41 is preferably smaller than offset value "ofs".

In FIG. 13, comparator 42 receives limit value "lmt" at its input terminal "a", and comparison value (trq−ofs) at its input terminal "b", and it compares these two values before sending the comparison result to selection control terminal S of selector 43. In response to the value received at terminal S, selector 43 outputs either one of values received at its input terminal A or B from output terminal O. To be more specific, when limit value "lmt" received at input terminal "a" of comparator 42 is greater than comparison value (trq−ofs) received at input terminal "b", comparator 42 determine the situation as "a>b". As a result, selector 43 outputs the value of subtracting the change value "dlm" from limit value "lmt". To the contrary, when limit value "lmt" received at input terminal "a" of comparator 42 is equal to or smaller than comparison value (trq−ofs) received at input terminal "b", selector 43 outputs comparison value (trq−ofs) in response to the comparison result determined by comparator 42.

The value output from selector 43 is latched by latch 34 at a clock timing, and then the signal latched by latch 34 is supplied from output terminal Q of latch 34 to limiter 64 as a new limit value "lmt". The new limit value "lmt" is supplied also to comparator 42 and subtraction unit 41, whereby a next process is carried out in units of clock.

As discussed above, limit value generator 63 generates a comparison signal by adding a negative value "–ofs" to drive signal "trq", and updates limit value "lmt" based on a size relation between the value of comparison signal (trq–ofs) and limit value "lmt". To be more specific, generator 63 handles the present value (trq–ofs) of the comparison signal as a new limit value "lmt" when limit value "lmt" is equal to or smaller than the present value (trq–ofs), and when limit value "lmt" is greater than the present value (trq–ofs) of the comparison signal, the value of subtracting positive change value "dlm" from limit value "lmt" is handled as a new limit value "lmt".

The operations of limit value generator 63 and limiter 64 discussed above are demonstrated hereinafter.

Figure 14:
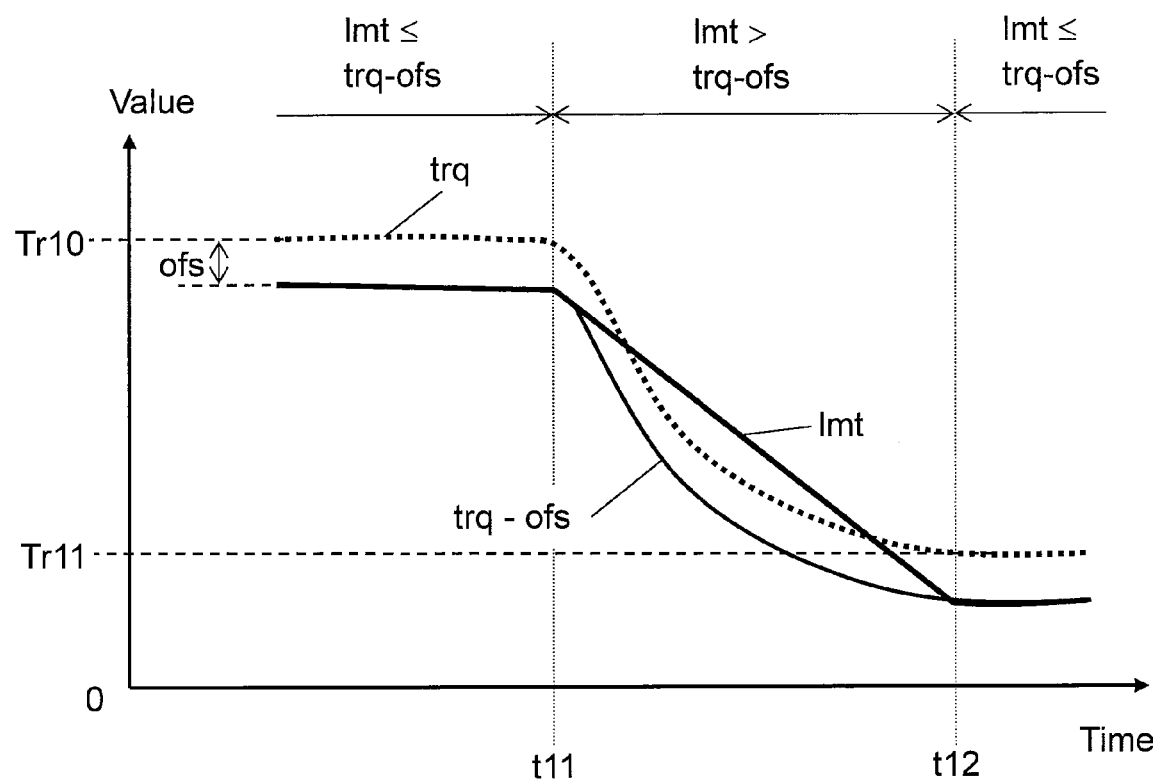
FIG. 14 shows waveforms illustrating changes in limit value of the motor drive device.
Figure 15:
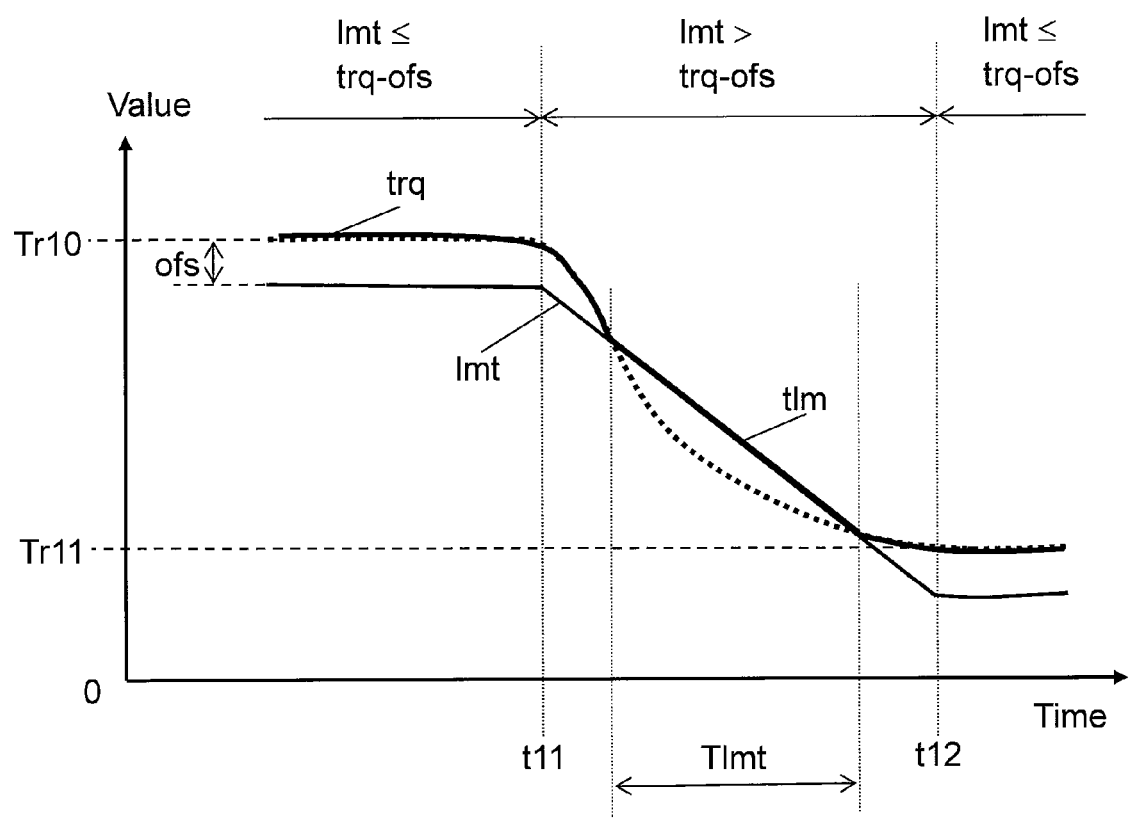
FIG. 15 shows waveforms of limiter output signals of the motor drive device.

FIG. 14 shows waveforms including changes in limit value "lmt" of motor drive device 60 in accordance with the third embodiment of the present invention. FIG. 15 shows waveforms including limiter output signal "tlm" of motor drive device 60 in accordance with the third embodiment. FIGS. 14 and 15 refer to a case of speed control in which an rpm corresponding to drive signal "trq" taking a value of Tr10 is changed by speed command signal Vr to another rpm corresponding to drive signal "trq" taking a value of Tr11. In other words, a drive amount corresponding to drive signal "trq" changes to decrease.

First, an operation of generating limit value "lmt" by limit value generator 63 is demonstrated with reference to FIG. 14. As FIG. 14 shows, drive signal "trq" is supplied to limit value generator 63 as a constant value of Tr10 until time "t11", and then in response to the change of speed command signal Vr, i.e. the speed should be lowered, drive signal "trq" starts decreasing sharply from time "t11" and converges on convergence value Tr11. Since comparison value (trq–ofs) is a result of subtracting offset value "ofs" from drive signal "trq", it changes as shown in FIG. 14 in response to drive signal "trq".

In the period until time "t11", comparison value (trq–ofs) is equal to limit value "lmt", so that selector 43 selects comparison value (trq–ofs). As a result, the value of drive signal "trq" minus offset value "ofs" is supplied as limit value "lmt" during the period until time "t11".

Next, when the time arrives at time "t11", drive signal "trq" decreases sharply, so that every time a new drive signal "trq" is supplied with its value decreasing. This involves a reduction in new comparison value (trq–ofs). The new comparison value (trq–ofs) is thus smaller than present limit value "lmt" output from latch 34. Selector 43 therefore selects the value of subtracting change value "dlm" from present limit value "lmt", and this selected value is output as a new limit value "lmt" from latch 34. As FIG. 14 shows, during the period from time "t11" to time "t12, since the new comparison value (trq–ofs) is smaller than the present limit value "lmt", limit value "lmt" decreases by change value "dlm" in units of clock.

Next, after time "t12", drive signal "trq" stays almost at a constant value, and the present limit value "lmt" output from latch 34 becomes equal to the new comparison value (trq–ofs), and then selector 43 selects comparison value (trq–ofs). After the time "t12", the value of subtracting offset value "ofs" from drive signal "trq" is supplied as limit value "lmt" to limiter 64. As discussed above, a speed is changed from an rpm to a lower one, limit value "lmt" as shown in FIG. 14 is supplied to limiter 64.

FIG. 15 shows drive signal "trq" supplied to limiter 64, limit value "lmt", and limiter output signal "tlm". During the period of "Tlmt", drive signal "trq" is limited by limit value "lmt" before it is output.

When drive signal "trq" sharply decreases, the regeneration phenomenon occurs as discussed previously, so that the motor supplies regeneration power to the motor drive device and the power supply in a manner contrary to the regular one. This phenomenon may adversely affect the motor drive device and the power supply. Limit value generator 63 and limiter 64 in this third embodiment allow preventing this adverse influence. To be more specific, limit value "lmt" generated by limit value generator 63 allows motor 10 to be driven in response to limiter output signal "tlm" that reduces a change in reduction of drive signal "trq" as shown in FIG. 15. As a result, the regeneration power can be reduced, and the adverse influence caused by the regeneration phenomenon to the power supply and the drive circuit can be mitigated.

The foregoing discussion refers to a case in which limit value generator 63 generates limit value "lmt" through digital processing in the respective functional blocks; however, as described in embodiments 1 and 2, it is more general to use a procedure based on a program. To be more specific, the respective functions shown in FIG. 12 are stored as a program in a memory, and a microprocessor implements the program for driving the motor.

Figure 16:
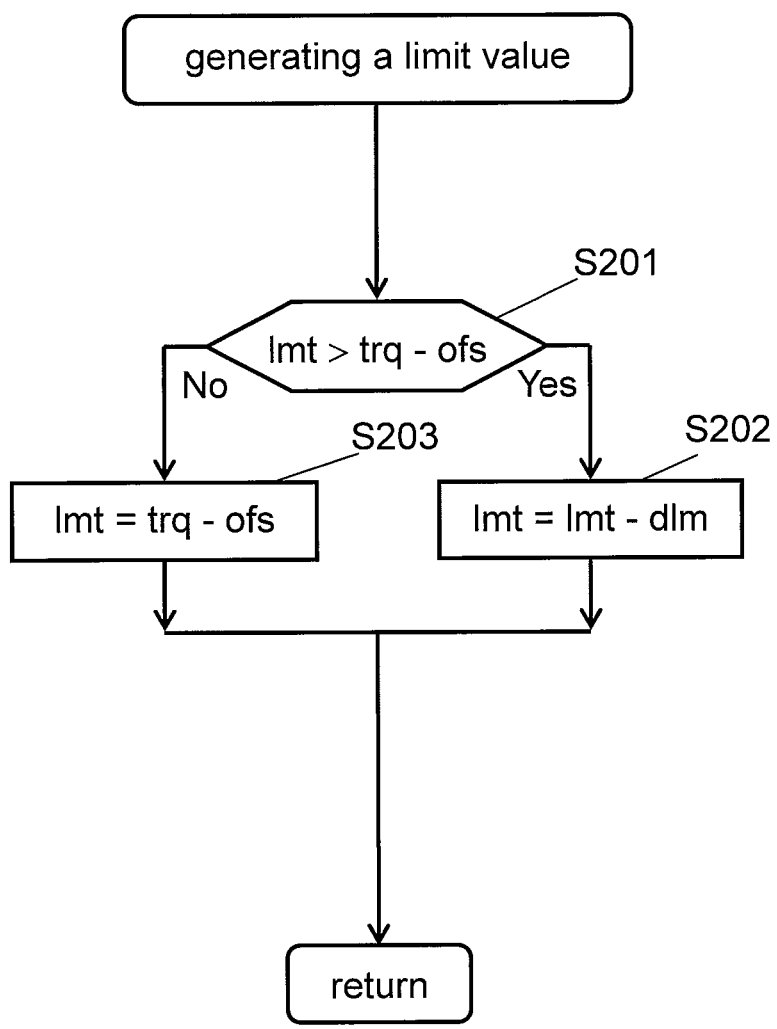
FIG. 16 is a flowchart of a generating process of a limit value of the motor drive device.

FIG. 16 is a flowchart of generating limit value "lmt" of motor drive device 60 in accordance with the third embodiment. Limit value generator 63 can implement the steps of generating a limit value that carries out the process following the flowchart.

In step S201, limit value generator 63 compares limit value "lmt" with comparison value (trq–ofs). When limit value "lmt" is greater than comparison value (trq–ofs), a value of subtracting change value "dlm" from limit value "lmt" is handled as a new limit value "lmt" in step S202. When limit value "lmt" is equal to or smaller than comparison value (trq–ofs), comparison value (trq–ofs) is handled as a new limit value "lmt" in step S203. After updating limit value "lmt" to a new one as discussed above, the step returns to, e.g. an original calling step. The foregoing process is repeated by limit value generator 63, whereby limit value "lmt" can be generated.

As discussed above, limit value generator 63 in accordance with this embodiment generates a comparison signal by adding a negative value "–ofs" to drive signal "trq", and updates limit value "lmt" based on a size relation between the value of comparison signal (trq–ofs) and limit value "lmt". When drive signal "trq" is smaller than limit value "lmt", limiter 64 limits the value of drive signal "trq" to limit value "lmt". In this third embodiment, limit value generator 63 handles comparison signal (trq–ofs) as a new limit value "lmt" when limit value "lmt" is equal to or smaller than comparison signal (trq–ofs), and it handles the value of limit value "lmt" minus a given value "dlm" as a new limit value "lmt" when limit value "lmt" is greater than comparison value (trq–ofs).

The foregoing structure allows limiter output signal "tlm" to decrease slowly when the speed of motor 10 is changed. In other words, a slowdown control can be done. As a result, regeneration electric power from motor 10 can be reduced, so that adverse influence caused by the regeneration phenomenon to the power supply and the drive circuit can be mitigated.

Embodiment 4

Figure 17:
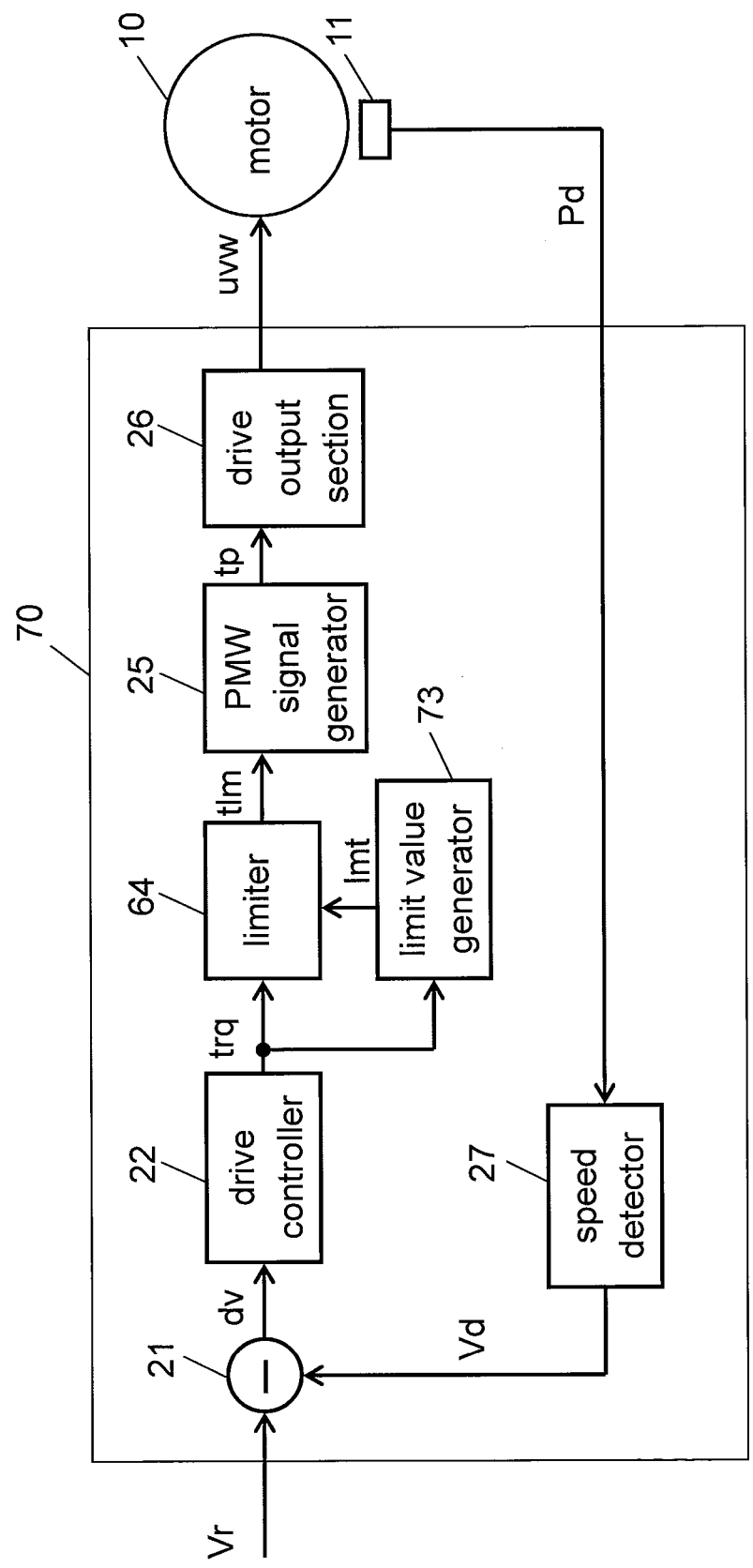
FIG. 17 is a block diagram illustrating a motor drive device in accordance with a fourth embodiment of the present invention.

FIG. 17 is a block diagram illustrating a structure of motor drive device 70 in accordance with the fourth embodiment of the present invention. Embodiment 4 also refers to a structure of the motor drive device that mitigates adverse influence, caused by the regeneration phenomenon, to the power supply and the drive circuit as already described in embodiment 3. Limit value generator 73 used in embodiment 4 differs from limit value generator 63 of motor drive device 60 used in embodiment 3 and shown in FIG. 12.

Figure 18:
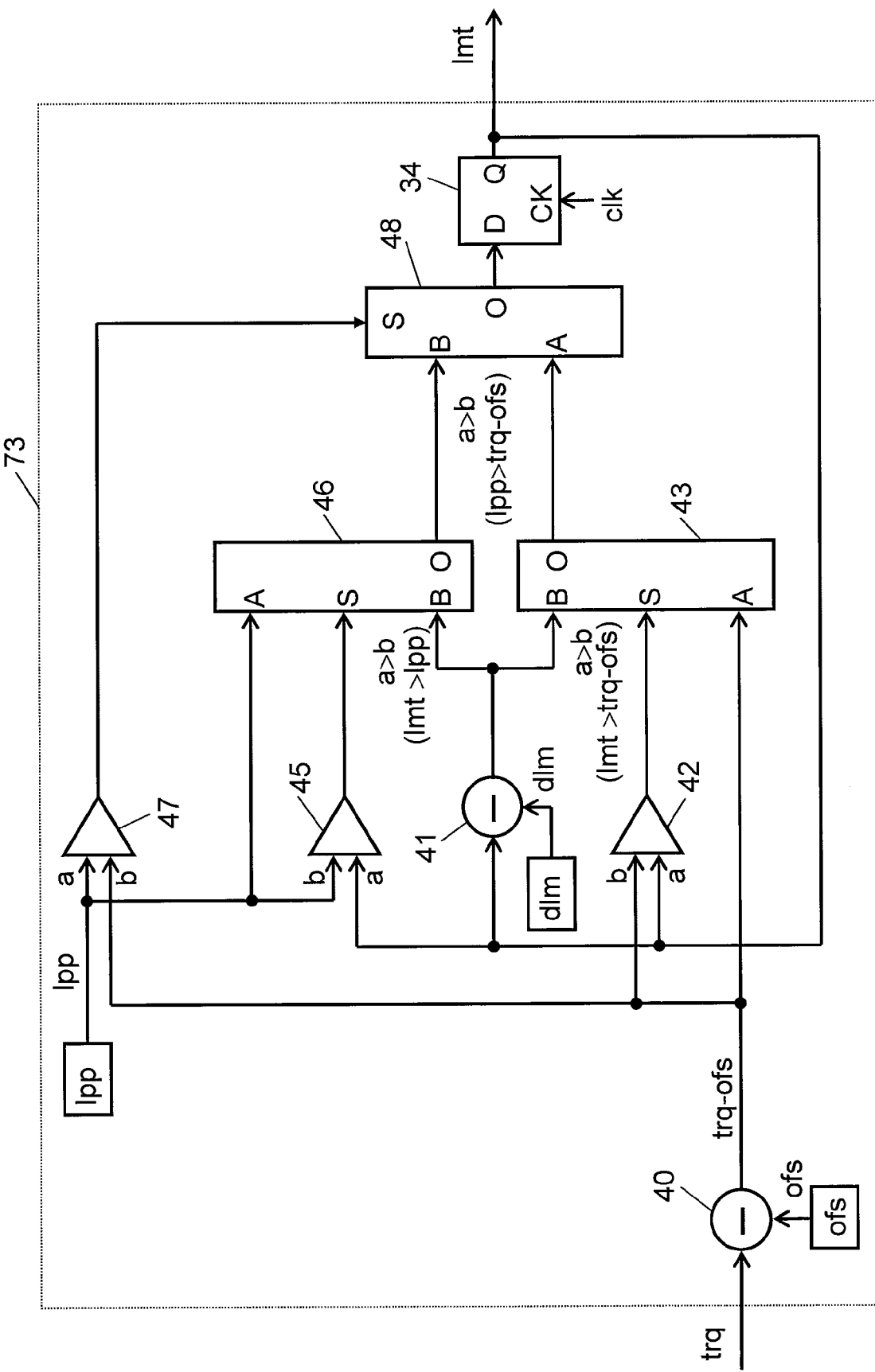
FIG. 18 is a block diagram of a limit value generator of the motor drive device shown in FIG. 17.

FIG. 18 is a block diagram of limit value generator 73 of motor drive device 70 in accordance with the fourth embodiment. Generator 73 includes a function of limiting a lower value of drive signal "trq" in addition to the functions of limit value generator 63. Structural elements similar to those in embodiment 3 have the same reference marks, and the detailed descriptions thereof are omitted here.

Limit value generator 73 shown in FIG. 18 includes comparators 45 and 47, selectors 46 and 48 in addition to the structural elements of generator 63. On top of that, lower limit value "lpp" that indicates a lower limit of limit value "lmt" is set in generator 73. Since lower limit value "lpp" sets a lower limit of limit value "lmt", it is set to zero or a positive value close to zero.

In FIG. 18, comparator 45 receives limit value "lmt" from latch 34 at input terminal "a", and lower limit value "lpp" at input terminal "b". Comparator 45 compares these two values and sends the comparison result to selection control terminal S of selector 46. In response to the value received at terminal S, selector 46 outputs either one of values received at its input terminal A or B from output terminal O. To be more specific, when limit value "lmt" received at input terminal "a" of comparator 45 is greater than lower limit value "lpp" received at input terminal "b", comparator 45 determines the situation as "a>b". As a result, selector 46 outputs the value obtained by subtracting change value "dlm" from limit value "lmt". To the contrary, when limit value "lmt" received at input terminal "a" of comparator 45 is equal to or smaller than lower limit value "lpp" received at input terminal "b", selector 46 outputs lower limit value "lpp" in response to the comparison result of comparator 45.

Comparator 47 receives lower limit value "lpp" at input terminal "a" and comparison value (trq–ofs) at input terminal "b", and comparator 47 compares these two values before it sends the comparison result to selection control terminal S of selector 48. In response to the value received at terminal S, selector 48 outputs either one of values received at its input terminal A or B from output terminal O. To be more specific, when lower limit value "lpp" received at input terminal "a" of comparator 47 is greater than comparison value (trq–ofs) received at input terminal "b", comparator 47 determines the situation as "a>b". As a result, selector 48 outputs an output value from selector 46. To the contrary, when lower limit value "lpp" received at input terminal "a" of comparator 47 is equal to or smaller than lower comparison value (trq–ofs) received at input terminal "b", selector 48 outputs an output value form selector 43 in response to the comparison result of comparator 47.

The value output from selector 48 is latched by latch 34 at a clock timing, and then the signal latched by latch 34 is supplied to limiter 64 as a new limit value "lmt". The new limit value "lmt" is supplied also to comparator 42, subtraction unit 41, and comparator 45, whereby a next process is carried out in units of clock.

The foregoing structure of limit value generator 73 allows implementing the same process as is done in embodiment 3 when the present comparison value (trq–ofs) is equal to or greater than lower limit value "lpp". To be more specific, when limit value "lmt" is equal to or smaller than the present comparison value (trq–ofs), which is then handled as a new limit value "lmt". When limit value "lmt" is greater than the present comparison value (trq–ofs), the value of subtracting change value "dlm" from limit value "lmt" is handled as a new limit value "lmt".

To the contrary, when the present comparison value (trq–ofs) is smaller than lower limit value "lpp", limit value generator 73 implements the following process: When limit value "lmt" is equal to or smaller than lower limit value "lpp", which is then handled as a new limit value "lmt". When limit value "lmt" is greater than lower limit value "lpp", the value of subtracting change value "dlm" from limit value "lmt" is handled as a new limit value "lmt".

The foregoing discussion refers to a case in which limit value generator 73 generates limit value "lmt" through digital processing in the respective functional blocks; however, as described in embodiments 1, 2, and 3, it is more general to use a procedure based on a program. To be more specific, the respective functions shown in FIG. 17 are stored as a program in a memory, and a microprocessor implements the program for driving the motor.

Figure 19:
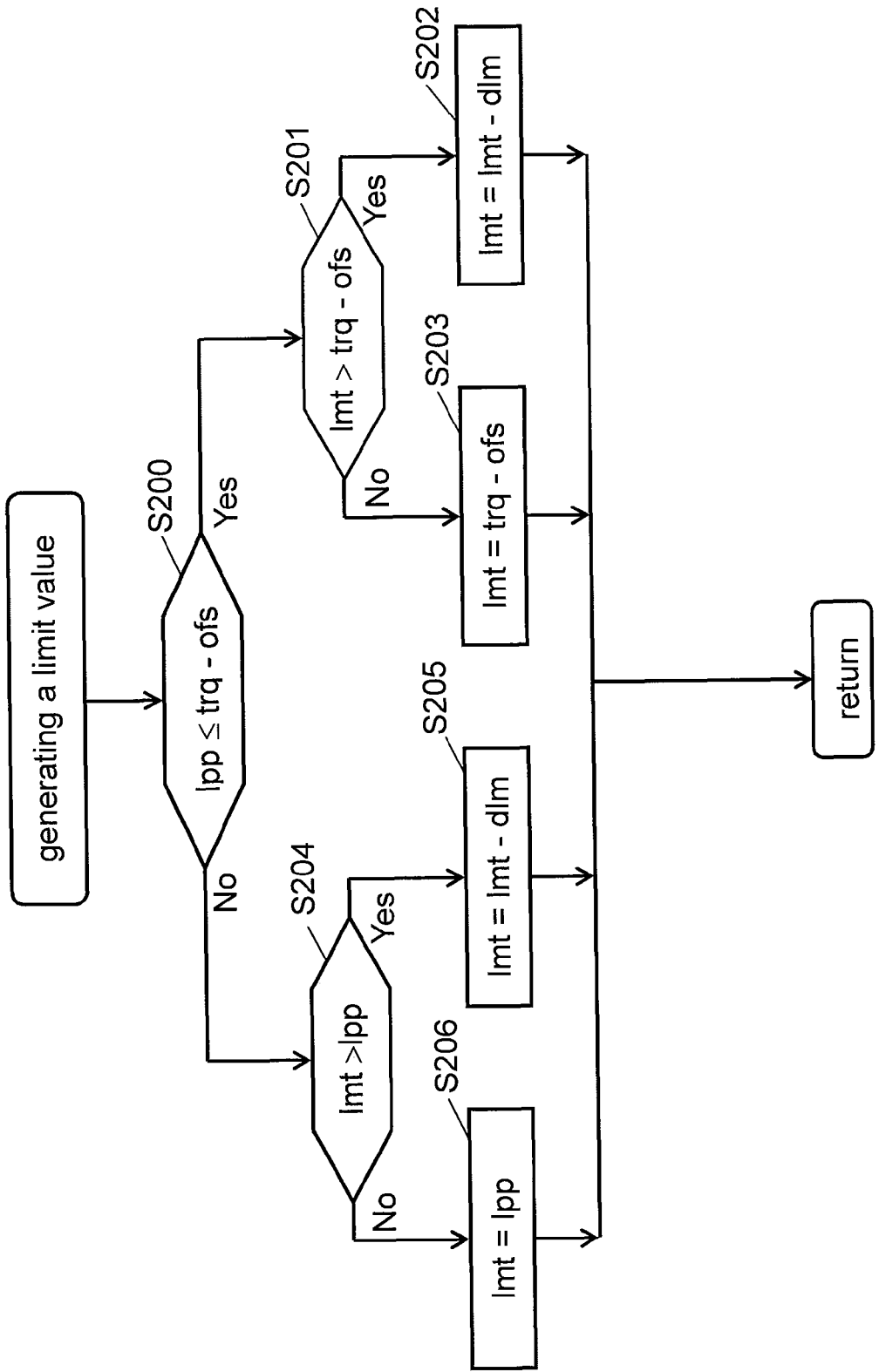
FIG. 19 is a flowchart of a generating process of a limit value of the motor drive device.

FIG. 19 is a flowchart of generating limit value "lmt" of motor drive device 70 in accordance with the fourth embodiment. Limit value generator 73 can implement the steps of generating a limit value that carries out the process following the flowchart.

Limit value generator 73 firstly compares lower limit value "lpp" with comparison value (trq–ofs) in step S200. When lower limit value "lpp" is equal to or smaller than comparison value (trq–ofs), the step proceeds to step S201. When lower limit value "lpp" is greater than comparison value (trq–ofs), the step proceeds to step S204.

In step S201, limit value generator 73 compares limit value "lmt" with comparison value (trq–ofs). When limit value "lmt" is greater than comparison value (trq–ofs), the value of subtracting change value "dlm" from limit value "lmt" is handled as a new limit value "lmt" in step S202. When limit value "lmt" is equal to or smaller than comparison value (trq–ofs), which is then handled as a new limit value "lmt" in step S203.

In step S204 limit value generator 73 compares limit value "lmt" with lower limit value "lpp", and when lmit value "lmt" is greater than lower limit value "lpp", the value of subtracting change value "dlm" from limit value "lmt" is handled as a new limit value "lmt" in step S205. When limit value "lmt" is equal to or smaller than lower limit value "lpp", which is then handled as a new limit value "lmt" in step S206.

After updating limit value "lmt" to a new one as discussed above, the step returns to, e.g. an original calling step. The foregoing process is repeated by limit value generator 73, whereby limit value "lmt" of which lower limit is limited to lower limit value "lpp" can be generated.

Limit value "lmt" generated by limit value generator 73 allows motor 10 to be driven in response to limiter output signal "tlm" that reduces a change in reduction of drive signal "trq". As a result, the regeneration power can be reduced, and the adverse influence caused by the regeneration phenomenon to the power supply and the drive circuit can be mitigated.

As discussed above, limit value generator 73 in accordance with this embodiment generates a comparison signal (trq–ofs) by adding a negative value "–ofs" to drive signal "trq", and updates limit value "lmt" based on a size relation between the value of comparison signal (trq–ofs) and limit value "lmt". When drive signal "trq" is smaller than limit value "lmt", limiter 64 limits the value of drive signal "trq" to limit value "lmt". In this fourth embodiment, limit value generator 73 handles the value of comparison signal (trq–ofs) as a new limit value "lmt" when limit value "lmt" is equal to or smaller than comparison signal (trq−ofs), and it handles the value of limit value "lmt" minus a given value "dlm" as a new limit value "lmt" when limit value "lmt" is greater than comparison value (trq−ofs). On top of that, lower limit value "lpp" that indicates a lower limit of limit value "lmt" is set in limit value generator 73. When the value of comparison signal (trq−ofs) is smaller than lower limit value "lpp" and limit value "lmt" is equal to or smaller than lower limit value "lpp", which is then handled as a new limit value "lmt". When the value of comparison signal (trq−ofs) is smaller than lower limit value "lpp" and limit value "lmt" is greater than lower limit value "lpp", the value of limit value "lmt" minus a given value "dlm" is handled as a new limit value "lmt".

The foregoing structure in accordance with embodiment 4 allows limiter output signal "tlm" to decrease slowly when the speed of motor 10 is changed. In other words, a slowdown control can be done. As a result, regeneration electric power from motor 10 can be reduced, so that adverse influence caused by the regeneration phenomenon to the power supply and the drive circuit can be mitigated.

As discussed above, the motor drive device of the present invention follows an external command to control driving the motor. The motor drive device comprising:
   a drive controller for generating a drive signal that drives the motor;
   a limiter for limiting a value of the drive signal within a range;
   a limit value generator for generating a limit value; and
   a drive output section for generating an energizing signal in response to an output signal from the limiter and energizing the winding wires of the motor with the aid of the energizing signal.

The limit value generator generates a comparison signal by adding an offset value to the drive signal, and updates the limit value based on a size relation between the value of the comparison signal and the limit value.

The foregoing structure allows controlling the limiter output signal to change slowly when a drive amount is changed, e.g. an rpm of the motor is changed from one to another. As a result, an increase in the electric current of the motor can be reduced when the drive amount is changed, and noises can be reduced when the drive amount is changed. On top of that, an adverse influence caused by a regeneration phenomenon can be mitigated.

The embodiments discussed previously refer to a speed control system as a control system; however, a positional control system can be used instead with an advantage similar to what is discussed previously.

The embodiment refers to a case in which a position detector detects a position of a mover, and the detected position is converted into a speed detection signal by a speed detector; however, the position detector can detect a position of load. Here is another way: the position detector can detect the speed of the mover or the load, and the detected speed can be converted into a speed detection signal. On top of that, based on a positional deviation between a position command signal issued and a position detection signal supplied from the position detector, the position can be controlled by the position control system. Here is another way: A position control system includes a speed detector formed of a circuit that integrates the detected speed and handles the integrated value as a detected position. In short, the present invention is applicable to a control system that carries out a feedback control by using a drive amount based on an amount of deviation between a command signal and a detection signal such that a moving action of the mover of the motor can follow a movement amount of, e.g. a position or a speed commanded. Here is still another way: The present invention is applicable to a structure in which a movement amount can be controlled directly by a drive amount based on a command signal. The moving action can be a rotating action of the mover of the motor, or a linear action, or another action.

The previous embodiments refer to the cases in which the winding wires are energized by the PWM method; however, driving methods other than PWM method can be used.

In embodiments 1 and 2, the positive offset value is used, and the limiter limits the value of drive signal to be equal to or smaller than the limit value when the drive signal exceeds the limit value. In embodiments 3 and 4, the negative offset value is used, and the limiter limits the value of drive signal to be equal to or greater than the limit value when the drive signal is smaller than the limit value. The embodiments refer to those two types separately; however, a structure including both types of limiters can be available, namely, this structure is equipped with a limiter that limits the drive signal to be equal to or smaller than the limit value as described in embodiment 1 or 2 and another limiter that limits the drive signal to be equal to or greater than the limit value as described in embodiment 3 or 4. This structure allows reducing an increment in electric current as well as mitigating adverse influence due to the regeneration phenomenon.

Industrial Applicability

The motor drive device and the motor drive method of the present invention allow a steady slow-up or slow-down operation when a speed command is changed, so that the present invention is suitable for a fan motor that needs no quick response. The motor drive device and the motor drive method thus can be applicable to fan motors used in home appliances, car-use electrical equipment, or other motors.

The invention claimed is:

1. A motor drive device to control driving a motor in accordance with an external command, the motor drive device comprising:
   a drive controller for generating a drive signal to drive the motor;
   a limiter for liming a value of the drive signal within a range;
   a limit value generator for generating a limit value; and
   a drive output section for generating an energizing signal in response to an output signal from the limiter, and energizing a winding of the motor with the energizing signal,
   wherein the limit value generator generates a comparison signal by adding an offset value to the drive signal, and updates the limit value based on a size relation between a value of the comparison signal and the limit value.

2. The motor drive device of claim 1, wherein the offset value is a positive value, and the limiter limits a value of the drive signal to be the limit value when the drive signal exceeds the limit value.

3. The motor drive device of claim 2, wherein the limit value generator uses a value of the comparison signal as a new limit value when the limit value is equal to or greater than the value of the comparison signal, or generates a new limit value by adding a given value to the limit value when the limit value is smaller than the value of the comparison signal.

4. The motor drive device of claim 3, wherein the limit value generator has an upper limit value set therein that indicates an upper limit of the limit value, and uses the upper limit value as a new limit value when a value of the comparison signal is greater than the upper limit value and the limit value is equal to or greater than the upper limit value, or generates a new limit value by adding the given value to the limit value when the value of the comparison signal is greater than the upper limit value and the limit value is smaller than the upper limit value.

5. The motor drive device of claim 1, wherein the offset value is a negative value, and the limiter limits a value of the drive signal to be the limit value when the drive signal is smaller than the limit value.

6. The motor drive device of claim 5, wherein the limit value generator uses a value of the comparison signal as a new limit value when the limit value is equal to or smaller than a value of the comparison signal, or generates a new limit value by subtracting a given value from the limit value when the limit value is greater than the value of the comparison signal.

7. The motor drive device of claim 6, wherein the limit value generator further has a lower limit value set therein that indicates a lower limit of the limit value, and uses the lower limit value as a new limit value when a value of the comparison signal is smaller than the lower limit value and the limit value is equal to or smaller than the lower limit value, or generates a new limit value by subtracting the given value from the limit value when the value of the comparison signal is smaller than the lower limit value and the limit value is greater than the lower limit value.

8. A method of driving a motor of a motor drive device that controls driving the motor in accordance with an external command, the method comprising the steps of:
generating a drive signal for driving the motor;
limiting a value of the drive signal within a range;
generating a limit value; and
generating an energizing signal in response to an output signal corresponding to the drive signal a value of which is limited within the range, and energizing a winding of the motor with the energizing signal,
wherein the step of generating the limit value includes steps of generating a comparison signal by adding an offset value to the drive signal, and updating the limit value based on a size relation between a value of the comparison signal and the limit value.

9. The method of claim 8, wherein the offset value is a positive value, and the step of limiting the drive signal within the range is to limit a value of the drive signal to be the limit value when the drive signal exceeds the limit value.

10. The method of claim 9, wherein the step of generating the limit value is to use a value of the comparison signal as a new limit value when the limit value is equal to or greater than the value of the comparison signal, or to generate a new limit value by adding a given value to the limit value when the limit value is smaller than the value of the comparison signal.

11. The method of claim 10, wherein an upper limit value that indicates an upper limit of the limit value is set in the step of generating the limit value, which step uses the upper limit as a new limit value when a value of the comparison signal is greater than the upper limit value and the limit value is equal to or greater than the upper limit value, or generates a new limit value by adding the given value to the limit when the value of the comparison signal is greater than the upper limit value and the limit value is smaller than the upper limit value.

12. The method of claim 8, wherein the offset value is a negative value, and the step of limiting a value of the drive signal within the range is to limit a value of the drive signal to be the limit value when the drive signal is smaller than the limit value.

13. The method of claim 12, wherein the step of generating the limit value is to use a value of the comparison signal as a new limit value when the limit value is equal to or smaller than a value of the comparison signal, or to generate a new limit value by subtracting a given value from the limit value when the limit value is greater than the value of the comparison signal.

14. The method of claim 13, wherein a lower limit value that indicates a lower limit of the limit value is set in the step of generating the limit value, which step uses the lower limit value as a new limit value when a value of comparison signal is smaller than the lower limit value and the limit value is equal to or smaller than the lower limit value, or generates a new limit value by subtracting the given value from the limit value when the value of the comparison signal is smaller than the lower limit value and the limit value is greater than the lower limit value.

* * * * *